US011277195B2

(12) United States Patent
Senior et al.

(10) Patent No.: US 11,277,195 B2
(45) Date of Patent: *Mar. 15, 2022

(54) APPARATUS AND METHOD FOR PROVIDING NETWORK COVERAGE IN A WIRELESS NETWORK

(71) Applicant: AIRSPAN IP HOLDCO LLC, Boca Raton, FL (US)

(72) Inventors: Paul Nicholas Senior, Bicester (GB); Masayoshi Son, Tokyo (JP); Eric Donald Stonestrom, Palm Beach, FL (US)

(73) Assignee: AIRSPAN IP HOLDCO LLC, Boca Raton, FL (US)

( * ) Notice: Subject to any disclaimer, the term of this patent is extended or adjusted under 35 U.S.C. 154(b) by 212 days.

This patent is subject to a terminal disclaimer.

(21) Appl. No.: 15/498,962

(22) Filed: Apr. 27, 2017

(65) Prior Publication Data

US 2018/0316412 A1  Nov. 1, 2018

(51) Int. Cl.
*H04B 7/155* (2006.01)
*H04W 52/46* (2009.01)
*H04W 16/28* (2009.01)
*H04W 52/38* (2009.01)
(Continued)

(52) U.S. Cl.
CPC ..... *H04B 7/15514* (2013.01); *H04B 7/15528* (2013.01); *H04W 16/28* (2013.01);
(Continued)

(58) Field of Classification Search
CPC ... H04W 16/28; H04W 52/46; H04W 88/085; H04B 7/15514; H04B 7/15528
(Continued)

(56) References Cited

U.S. PATENT DOCUMENTS 10,009,776 B1 * 6/2018 Allen .............. G08B 7/06
2006/0084379 A1   4/2006 O'Neill
(Continued)

FOREIGN PATENT DOCUMENTS

WO    2014113749 A1    7/2014
WO    2014124666 A1    8/2014
(Continued)

OTHER PUBLICATIONS

PCT IPRP from PCT/GB2018/050799, Jul. 11, 2019, 19 pages.
(Continued)

*Primary Examiner* — Faruk Hamza
*Assistant Examiner* — Jean F Voltaire
(74) *Attorney, Agent, or Firm* — Haynes Beffel & Wolfeld LLP; Andrew Dunlap

(57) ABSTRACT

An apparatus and method are described for providing enhanced network coverage in a wireless network. The apparatus has a first antenna system for providing a first sector of a network, and a second antenna system for providing a second sector of the network. Further, the apparatus has a third antenna system for communicating with a base station of the network to provide a common wireless backhaul link for the first sector and the second sector. The apparatus also comprises control circuitry to monitor a performance characteristic of the common wireless backhaul link, and in dependence on the performance characteristic, to implement at least one mechanism to influence whether items of user equipment within at least one of the first sector and the second sector connect to the network via the apparatus.

21 Claims, 13 Drawing Sheets

(51) Int. Cl.
  *H04W 88/08* (2009.01)
  *H04W 24/02* (2009.01)
(52) U.S. Cl.
  CPC ........... *H04W 52/38* (2013.01); *H04W 52/46*
    (2013.01); *H04W 24/02* (2013.01); *H04W*
    *88/085* (2013.01)
(58) Field of Classification Search
  USPC ........................................................ 370/315
  See application file for complete search history.

(56) References Cited

U.S. PATENT DOCUMENTS

| | | | |
|---|---|---|---|
| 2009/0213730 A1 | 8/2009 | Zeng et al. | |
| 2010/0296439 A1 | 11/2010 | Leung et al. | |
| 2011/0237255 A1 | 9/2011 | Furukawa | |
| 2014/0092803 A1* | 4/2014 | Picker | H04W 16/28 370/315 |
| 2015/0215854 A1 | 7/2015 | Ling | |
| 2015/0304960 A1 | 10/2015 | Yang et al. | |
| 2015/0365959 A1 | 12/2015 | Coldrey | |
| 2015/0373672 A1* | 12/2015 | Forssell | H04L 47/76 370/329 |
| 2016/0104942 A1 | 4/2016 | Pera et al. | |
| 2016/0149635 A1 | 5/2016 | Hinman et al. | |
| 2016/0191437 A1* | 6/2016 | Thomas | H04W 4/12 709/206 |
| 2016/0262161 A1 | 9/2016 | Li et al. | |
| 2016/0269969 A1 | 9/2016 | Braithwaite | |
| 2016/0381585 A1 | 12/2016 | Dudzinski et al. | |
| 2017/0048775 A1* | 2/2017 | Kim | H04W 76/18 |
| 2017/0142595 A1* | 5/2017 | Ljung | B64C 39/024 |
| 2017/0215210 A1 | 7/2017 | Lipowski et al. | |
| 2017/0230086 A1 | 8/2017 | Chen et al. | |
| 2018/0159780 A1* | 6/2018 | Essigmann | H04L 47/2483 |

FOREIGN PATENT DOCUMENTS

| | | |
|---|---|---|
| WO | 2016028969 A1 | 2/2016 |
| WO | 2016062074 A1 | 4/2016 |
| WO | 2017136503 A1 | 8/2017 |

OTHER PUBLICATIONS

3GPP TR 36.806 V9.0.0 (Mar. 2010) 3rd Generation Partnership Project; Technical Specification Group Radio Access Network; Evolved Universal Terrestrial Radio Access (E-UTRA); Relay architectures for E-UTRA (LTE-Advanced) Release 9), Mar. 2010, 34 pages.

3GPP TR 36.819 V11.1.0 (Dec. 2011) 3rd Generation Partnership Project; Technical Specification Group Radio Access Network; Coordinated Multi-Point Operation for LTE Physical Layer Aspects (Release 11), Dec. 2011, 69 pages.

Draytek, "Vigor 2862L Series 3G/4G LTE and VDSL Professional Router," Oct. 29, 2015, [online], available from: https://www.draytek.co.uk/products/business/vigor-2862I, accessed Nov. 9, 2018 (see GB Search Report), 22 pages.

3B Search Report from GB1804897.5, dated Sep. 24, 2018, 6 pages.

IEEE, "High-Capacity Ethernet Backhaul Radio Systems for Advanced Mobile Data Networks," Aug. 2009, IEEE Microwave Magazine, [online], available from: https://ieeexplore.ieee.org/stamp/stamp.jsp?arnumber=5185531, accessed Nov. 9, 2018, 6 pages, (see GB Search Report).

PCT Search Report and Written Opinion from PCT/GB2018/050799, dated Jun. 25, 2018, 15 pages.

Reddit, "how does mesh work with themet backhaul," Feb. 3, 2017, reddit.com, [online], available from: https://www.reddit.com/r/eero/comments/5x3p0w/how_does_mesh_work_with_ethemet_backhaul, accessed Nov. 9, 2018, 4 pages (see GB Search Report).

Smallnetbuilder, "eero Home Wi-Fi System Reviewed," 16/03/206, smallnetbuilder.com, [online], available from: https://www.smallnetbuilder.com/wireless/wireless-reviews/32962-eero-home-wi-fi-system-reviewed?limitstart-0, accessed Nov. 9, 2018, 32 pages (see GB Search Report).

U.S. Final Action in U.S. Appl. No. 15/499,131 dated Oct. 3, 2018, 29 pages.

U.S. Office Action from related case U.S. Appl. No. 15/499,027 dated Mar. 7, 2019, 34 pages.

U.S. Office Action in U.S. Appl. No. 15/499,131 dated Apr. 8, 2019, 26 pages.

U.S. Office Action in U.S. Appl. No. 15/499,131 dated May 18, 2018, 25 pages.

U.S. Office Action Response from related case U.S. Appl. No. 15/499,027 dated May 31, 2019, 13 pages.

U.S. Office Action from related case U.S. Appl. No. 15/499,027 dated Aug. 29, 2019, 40 pages.

U.S. Office Action in U.S. Appl. No. 15/499,131 dated Jul. 25, 2019, 26 pages.

\* cited by examiner

APPARATUS AND METHOD FOR PROVIDING NETWORK COVERAGE IN A WIRELESS NETWORK

BACKGROUND

The present technique relates to an apparatus and method for providing enhanced network coverage in a wireless network.

As more and more users embrace mobile technology, this is placing ever increasing demands on the mobile networks used to support mobile communication. The networks are required to not only support an ever increasing number of devices, but the functionality associated with such devices has become ever more complex, so this has also increased the capacity requirements within the network.

Accordingly, there is a need for network operators to provide increased network coverage, but also to improve network capacity so as to service the high performance demands placed upon the network by users of modern smartphones and the like.

The problems of providing sufficient network coverage and capacity can be particularly problematic in urban environments, where there is typically not only a high density of users, but where the urban infrastructure, such as large buildings, can significantly attenuate signals. This hence reduces the overall quality of service provided by a network and exacerbates the problem of seeking to provide sufficient network coverage and network capacity to service the users. Accordingly, it would be desirable to provide techniques that enabled coverage and capacity to be improved.

SUMMARY

In one example configuration, there is provided an apparatus comprising: a first antenna system to provide a first sector of a network; a second antenna system to provide a second sector of the network; a third antenna system to communicate with a base station to provide a common wireless backhaul link for said first sector and said second sector of the network; and control circuitry to monitor a performance characteristic of the common wireless backhaul link and, in dependence on said performance characteristic, to implement at least one mechanism to influence whether items of user equipment within at least one of said first sector and said second sector connect to the network via the apparatus.

In another example, there is provided a method of controlling connection to a network using an apparatus having a first antenna system to provide a first sector of the network, a second antenna system to provide a second sector of the network, and a third antenna system to communicate with a base station to provide a common wireless backhaul link for said first sector and said second sector of the network, said method comprising: monitoring a performance characteristic of the common wireless backhaul link; and in dependence on said performance characteristic, implementing at least one mechanism to influence whether items of user equipment within at least one of said first sector and said second sector connect to the network via the apparatus.

In yet another example, there is provided an apparatus comprising: a first antenna means for providing a first sector of a network; a second antenna means for providing a second sector of the network; a third antenna means for communicating with a base station to provide a common wireless backhaul link for said first sector and said second sector of the network; and control means for monitoring a performance characteristic of the common wireless backhaul link and, in dependence on said performance characteristic, for implementing at least one mechanism to influence whether items of user equipment within at least one of said first sector and said second sector connect to the network via the apparatus.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
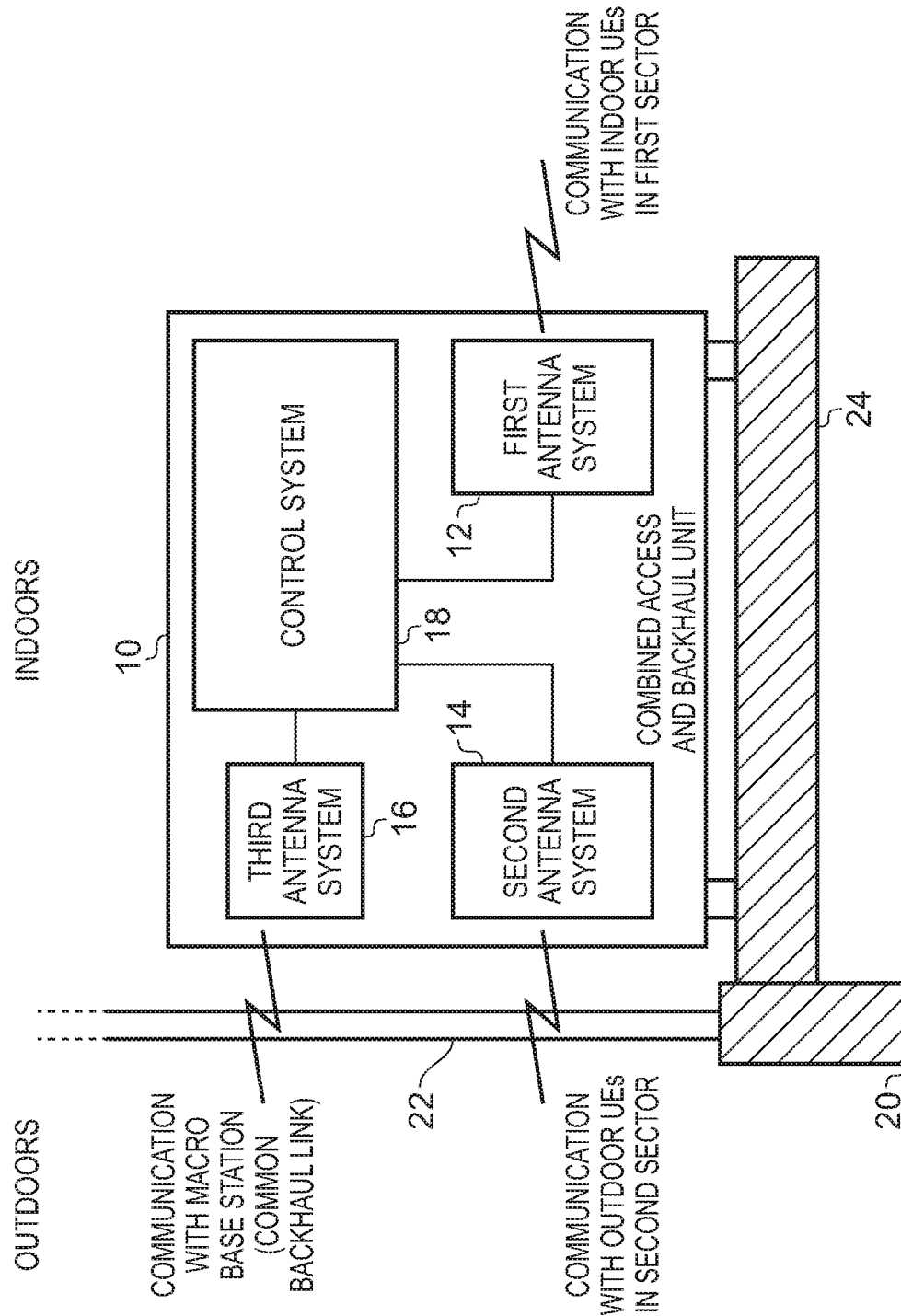
FIG. 1 is a block diagram schematically illustrating a combined access and backhaul unit in accordance with one example of the present technique.

Before discussing the present technique with references to the accompanying figures, the following description of embodiments is provided.

In one example, an apparatus according to the present technique is provided that has a first antenna system for providing a first sector of a network and a second antenna system for providing a second sector of the network. The apparatus is arranged to communicate with a base station of the network via a third antenna system, the third antenna system providing a common wireless backhaul link for the first and second sector.

The apparatus according to the present technique can be deployed to establish a good quality wireless backhaul link via the third antenna system to a base station of the network with the use of the first antenna system then allowing for a first sector of coverage to be established which provides enhanced availability of the network. Use of the second antenna system also allows for a second sector of coverage to be established which also provides enhanced availability of the network. Therefore, items of user equipment that that are able to connect to the network via the apparatus are provided with a further connection option for connecting to the network. In particular whilst it is still possible that they may connect directly to a macro base station of the network, also referred to herein as a base station, donor relay macrocell, or a donor eNodeB (DeNB), when they are within the geographical coverage area covered by the first and second sectors they can instead connect to the network via the first or second antenna systems respectively, with the third antenna system then being used to provide a backhaul connection into the network for those users. This provides a significantly enhanced flexibility, and can also give rise to significant spectral efficiency improvements within the network. In particular, the apparatus can be configured to provide a high quality backhaul communication link to the base station of the network, and in addition can provide high quality connections for items of user equipment residing within the first sector and the second sector. This can lead to the establishment of high performance links that can employ efficient modulation schemes to make more efficient use of the available spectrum, when compared with a situation where those items of user equipment instead establish a direct connection to the macro base station of the network. As a result, the overall spectral efficiency of the network can be increased.

The apparatus according to the present technique further comprises control circuitry to monitor a performance characteristic of the common wireless backhaul link, and in dependence on said performance characteristic, to implement at least one mechanism to influence whether items of user equipment within at least one of said first sector and said second sector connect to the network via the apparatus.

In the above described example when items of user equipment connect to the network via the apparatus, the quality of the network connection provided by the apparatus to the items of user equipment may be dependent on the quality of the common wireless backhaul link. For example, when the common wireless backhaul link exhibits a reduced spectral efficiency, then the connection quality experienced by items of user equipment may also reduce. However, by implementing at least one mechanism to influence whether items of user equipment within at least one of the sectors connect to the network in dependence on the performance characteristic of the common wireless backhaul link, the apparatus can control the extent to which network connectivity is provided to items of user equipment in dependence on the connection quality that it is able to provide. This ultimately improves the overall quality of network service as items of user equipment that are experiencing a poor connection via the apparatus can be influenced to seek alternative connection options that may provide a better connection. Furthermore, the effect of items of user equipment subsequently disconnecting from the apparatus can cause a knock on benefit on the quality of the connection provided by the apparatus to any remaining items of user equipment. For example, as some items of user equipment are encouraged to disconnect from the apparatus, more bandwidth of the common wireless backhaul link becomes available to any remaining items of user equipment, thus improving their connection to the network via the apparatus.

By virtue of the first antenna system and the second antenna system, the apparatus can selectively provide and control network access via either or both of the sectors. For example, in an instance when the performance characteristic indicates that the wireless backhaul link is suffering a reduced quality of connection, the apparatus can prioritise items of user equipment in one of the sectors by specifically influencing whether items of user equipment within the other sector connect to the network via the apparatus. This affords greater control over the arrangement of the portion of the network infrastructure provided by the apparatus.

In some examples, the at least one mechanism is arranged to perform at least one of: adjusting a signal strength of signals transmitted by at least one of the first antenna system and the second antenna system; switching at least one of the first antenna system and the second antenna system between an active state and an inactive state; and transmitting a connection throttling message to at least one item of user equipment to influence whether the at least one item of user equipment connects to the network via the apparatus, or connects to the network via an alternative connection option. Therefore, the apparatus can be arranged with a number of techniques for influencing whether items of user equipment connect to the network via either antenna system, each associated with its own particular benefits. For example, adjusting the signal strength of signals transmitted by one of the antenna systems is a high precision technique that allows for fine grain control over sector usage. Alternatively, or additionally, switching an antenna system between an active state and an inactive state is a simple technique that allows for easy implementation. The transmission of a connection throttling message provides an alternative where less control is required of the antenna systems, but also provides a flexible approach for influencing sector usage.

For example, the connection throttling message can be one of: a targeted connection throttling message to be uniquely transmitted to a target item of user equipment; and a multi-connection throttling message to be transmitted to multiple items of user equipment within the first sector and the second sector. In the case of the targeted connection throttling message the apparatus can selectively influence whether individual items of user equipment connect to the network via the apparatus or via an alternative connection. This provides high precision control over sector usage. The multi-connection throttling message provides an efficient alternative as a message may be transmitted to multiple items of user equipment to be influenced, thereby enabling multiple items of user equipment to be subjected to throttling simultaneously. This requires less direct control from the apparatus and is thus a cheap and straightforward technique for controlling sector usage.

There are a number of ways in which the signal strength of transmitted signals could be controlled by the apparatus, but in one example the control circuitry is arranged to adjust the signal strength by adjusting a transmission power of at least one of the first antenna system and the second antenna system. This provides a definitive technique for controlling sector usage as the geographical magnitude of the controlled sector will vary proportionally to the transmission power. Therefore as transmission power is decreases, for example, the sector size will shrink and items of user equipment that fall outside of the geographical area of network coverage provided by the sector will be unable to connect to the network via the apparatus.

In some examples the first antenna system and the second antenna system are configured such that when the apparatus is deployed at a periphery of a building, the first sector extends into the building to provide enhanced availability of the network to items of user equipment within the building, and the second sector extends externally to the building to provide an additional source of network coverage to items of user equipment external to the building. Whilst modern telecommunications technologies, such as the "Long-Term Evolution (LTE) Standard" or the "5G New Radio (NR) Standard", allow for high-speed wireless communication with items of user equipment, the signal propagated from the base stations typically do not have good indoor penetration. Thus by placing the apparatus according to the present technique at a periphery of a building then the first sector of coverage can be established such that it extends into the building to provide enhanced availability of the network inside the building. In addition, in urban environments it is also often the case that items of user equipment in the open environment, for example belonging to users moving around at street level between buildings, can experience poor connectivity. In particular, pockets of poor network coverage may develop, and even in areas where there is network coverage, the link quality established with the base station may be relatively poor, resulting in reduced bit rates observed by the item of user equipment, and a less efficient utilisation of the available network spectrum. This reduces not only the quality of service observed by certain users, but can also degrade the overall spectral efficiency. Thus in accordance with the present technique, the same apparatus that is used to create a first sector that extends into the building to provide enhanced availability of the network to items of user equipment within the building, is also able to re-radiate network coverage externally to the building by use of the second antenna system. Accordingly, items of user equipment external to the building are now provided with a further connection option for connecting into the network. In particular, whilst it is still possible that they may connect directly to a macro base station of the network, when they are present within the geographical coverage area covered by the second sector they can instead connect to the network via the second antenna system of the apparatus, with the third antenna system then being used to provide a backhaul connection into the network for those users along with users connected via the first antenna system.

This provides significantly enhanced flexibility, and can also give rise to significant spectral efficiency improvements within the network. In particular, the apparatus can be configured to provide a high quality backhaul communication link to the base station of the network, and in addition can provide high quality connections for items of user equipment residing within the first sector and the second sector. This can lead to the establishment of high performance links that can employ efficient modulation schemes to make more efficient use of the available spectrum, when compared with a situation where those items of user equipment instead establish a direct connection to the macro base station of the network. As a result, the overall spectral efficiency of the network can be increased.

In some examples, when the apparatus is deployed inside the building at said periphery, the second antenna system is configured to generate at least one beam pattern that propagates through said periphery to facilitate communication with at least one item of user equipment within said second sector. If desired, directional antennas can be used to generate a beam pattern that radiates in a desired direction externally to the building. For example, this second antenna system may be arranged so as to radiate a beam pattern that will ensure good coverage for users at street level. Alternatively, or in addition, the beam pattern created by the second antenna system may cause the second sector to extend across a street into an adjacent building, so that items of user equipment within that adjacent building may be able to connect into the network via the apparatus.

The apparatus can be deployed in a variety of locations, but in one example is intended to be deployed adjacent to a window at the periphery of the building. In one particular example the apparatus is shaped so as to facilitate placement on a windowsill. This can provide a very convenient location for the apparatus, where it does not get in the way of users going about their business inside the building, and where it is likely that a strong connection with the base station of the network can be established. Moreover, by providing an apparatus that can be easily deployed within a building, this can provide a very cheap and efficient mechanism for a network operator to rapidly increase network coverage, whilst also facilitating improved spectral efficiency, and thereby enhancing the capacity of the network.

In some examples, the control circuitry is arranged to implement said at least one mechanism to at least influence whether items of user equipment within the second sector external to the building connect to the network via the apparatus. Therefore, the apparatus can be arranged to prioritise users within the first sector internal to the building, which can be desirable for a number of reasons. For example, the apparatus may be provided within a residential building, and the residents of the building may desire prioritised connectivity to the apparatus compared to items of user equipment external to the building. Furthermore, it is more likely that items of user equipment external to the building have other viable connection options available to them, such as via another apparatus installed in a different building, or directly via a macro cell. Therefore, influencing the sector usage of the second sector is likely to have a less significant impact on the items of user equipment within this sector.

In some examples, the apparatus is configured to receive link quality information from an item of user equipment indicating a quality of an additional connection option that is available to said item of user equipment to connect to the network rather than connecting via the apparatus. By acquiring information that provides details of other connection options available to the items of user equipment, the apparatus can be arranged to consider the overall quality of service provided by the network as perceived from items of user equipment.

For example, the control circuitry can be configured to implement the at least one mechanism in dependence on the performance characteristic and the link quality information. Therefore, the effect that influencing whether items of user equipment connect to the network via the apparatus will have on the items of user equipment's ability to connect to the network can be considered before implementing the at least one mechanism. This improves the overall quality of service provided by the network infrastructure as that apparatus can be arranged such that items of user equipment will not be left with a poor, or no, connection.

There are a number of ways in which the control circuitry can be arranged to assess the performance characteristic. In some examples the control circuitry is configured to compare the performance characteristic against at least one performance threshold of the common wireless backhaul link, and to implement the at least one mechanism taking into account said comparison. This provides a straightforward and definitive approach to determining when to implement the at least one mechanism.

In addition, the control circuitry can be configured to compare the performance characteristic against a plurality of performance thresholds of the common wireless backhaul link. This improves flexibility as the at least one mechanism can be implemented in an incremental manner based on the performance characteristics relation to the plurality of thresholds.

In some examples the at least one mechanism comprises adjusting a signal strength of signals transmitted by at least one of the first antenna system and the second antenna system, and the control circuitry is configured to adjust the signal strength as a linear function of the performance characteristic when the performance characteristic is between a first and a second of the plurality of performance thresholds. This allows for accurate control over sector usage specific to the monitored performance characteristic. Therefore, an improved network infrastructure can be arranged in terms of the overall quality of service provided to items of user equipment.

In some other examples, said at least one mechanism comprises adjusting a signal strength of signals transmitted by at least one of said first antenna system and said second antenna system, and said control circuitry is configured to adjust said signal strength as a step function of said performance characteristic when said performance characteristic is between a maximum and a minimum of said plurality of performance threshold. This flexible approach can be used to provide a degree of accuracy proportional to the number of steps in the step function, but has less of an impact on the processing required of the apparatus.

In some examples, said apparatus is configured to receive link quality information from an item of user equipment indicating a quality of an additional connection option that is available to said item of user equipment to connect to said network rather than connecting via said apparatus, and said control circuitry is configured to adjust at least one performance threshold of said common wireless backhaul link based on said link quality information. Adjusting at least one performance threshold in this way allows the implementation of the mechanism to be fine-tuned to take account of the quality of other connection options available to the items of user equipment.

In some examples, said control circuitry is configured to implement said at least one mechanism to influence whether items of user equipment within the second sector connect to the network via the apparatus and to influence whether items of user equipment within the first sector connect to the network via the apparatus, the control circuitry being arranged to implement said at least one mechanism such that as the performance of the common backhaul link degrades, usage of the second sector to connect to the network is initially inhibited before usage of the first sector to connect to the network. Therefore, the apparatus can be configured to prioritise items of user equipment in the first sector over items of user equipment in the second sector. There may be a desire to prioritise items of user equipment in this manner for a number of reasons. For example, an owner of the apparatus may make significant use of the enhanced network availability of one of the sectors, and therefore the network operator may wish to decrease usage of the other sector prior to decreasing usage of the sector which that user utilises.

The performance characteristic may take a variety of forms, but in one example is indicative of spectral efficiency, and said control circuitry is configured to measure at least one of: reference signals receive power; a signal to interference plus noise ratio; and a throughput of the apparatus; to determine said performance characteristic of the common wireless backhaul link. Thus there is a variety of parameters that may be monitored in determining the performance characteristic, providing a highly diverse and flexible approach to determining whether to influence usage of either sector.

In some examples, said control circuitry is configured to implement said at least one mechanism in dependence on said performance characteristic and a signal indicative of synchronisation information. For example, if the synchronisation information indicates that the apparatus is not well synchronised with other components in the network, it may be considered appropriate to turn off one of the sectors, for example a sector providing outdoor coverage. In contrast, even with poor synchronisation it may still be acceptable to provide a sector of coverage that extends indoors.

The synchronisation information can be provided in a number of ways, but in one embodiment the apparatus may have a GPS receiver for receiving a GPS signal that can be used to determine synchronisation information.

Particular embodiments will now be described with reference to the Figures.

FIG. 1 schematically illustrates an apparatus 10 as used in the described embodiments. Herein, the apparatus will also be referred to as a combined access and backhaul unit. As shown, the combined access and backhaul unit 10 may in one embodiment be positioned adjacent to a periphery 20, 22 of a building. In one particular embodiment, it is located on a windowsill 24 adjacent to a window 22 at the periphery of the building.

The combined access and backhaul unit 10 has a number of distinct antenna systems. In particular, a first antenna system is used to provide a first sector of the network that extends into the building so as to provide enhanced availability of the network to items of user equipment within the building. To access the network for any items of user equipment that connect via the first antenna system, it is necessary to connect the apparatus 10 into the network. This is achieved through use of the third antenna system 16, which is arranged to establish a backhaul link with a base station of the network. Since such a base station will typically be provided externally to the building, the third antenna system is arranged to generate at least one beam pattern that propagates through the window 22 to establish a wireless backhaul link with the base station.

Modern telecommunications Standards, such as the LTE Standard, allow for high-speed wireless communication with items of user equipment. However, the signals propagated from the base stations typically do not have good indoor penetration. By placing the apparatus 10 at a periphery of a building, a good quality link can typically be established via the third antenna system to a base station of the network, with the use of the first antenna system 12 then allowing for a first sector of coverage to be established that extends into the building to provide enhanced availability of the network inside the building.

However, in addition, in urban environments it is also often the case that items of user equipment in the open environment, for example belonging to users moving around at street level between buildings, can experience poor connectivity. For example, pockets of poor network coverage may develop, due to shadowing from buildings and the like, and even in areas where there is network coverage, the link quality established with the base station may be relatively poor. This can result not only in reduced quality of service observed by certain users, but also can degrade the overall spectral efficiency of the network due to the less efficient utilisation of the available network spectrum that can result from use of such poor quality links.

To address this problem, the combined access and backhaul unit 10 provides an additional antenna system, namely the second antenna system 14, which provides a second sector of the network, the second antenna system generating at least one beam pattern that propagates through the periphery 22 to facilitate communication with at least one item of user equipment external to the building. Hence, through use of the second antenna system, the combined access and backhaul unit 10 can re-radiate network coverage externally to the building, such that items of user equipment external to the building and falling within the coverage area of the second sector are now provided with a further connection option for connecting into the network.

For any users that connect to the apparatus 10 via either the first antenna system or the second antenna system, then the third antenna system is used to provide a common wireless backhaul link back into the network. By such an approach, it is possible to establish good quality links with items of user equipment in both the first and second sectors, through use of the respective first and second antenna systems. In combination with a good quality backhaul link provided by the third antenna system to a macro base station of the network, this can result in the various items of user equipment connected to the network via the apparatus 10 being provided with higher quality links into the network, allowing for more efficient use of the available network spectrum when compared with a situation where those items of user equipment instead establish a direct connection to a macro base station of the network. As a result, the overall spectral efficiency of the network can be increased.

It should be noted that if desired the apparatus 10 could be mounted externally to the building at the periphery, in which case the first antenna system would generate at least one beam pattern that propagates through the periphery into the building, whilst the second and third antenna systems' beam patterns would no longer need to propagate through the periphery. However, for the following description of embodiments, it will be assumed that the apparatus 10 is provided internally at the periphery of the building. This can enable a reduction in the cost of the apparatus, by avoiding the need to weatherproof the housing, and also provides for significantly simplified deployment. In one particular embodiment, the apparatus 10 is shaped so that it can readily be placed on a windowsill or the like within the building, this providing a very convenient location where it does not get in the way of users going about their business inside the building, and where it is likely that a strong connection with the base station of the network can be established.

Each of the antenna systems 12, 14, 16 will include not only an array of antenna elements used to transmit and receive the RF signals, but also the associated RF stage circuit elements that process the transmitted and received RF signals. In addition, each of the antenna systems will have associated baseband stage (i.e. digital signal processing stage) circuits for processing the transmit signals prior to them being converted into RF signals, and to process received signals after they have been converted from RF signals into baseband signals. These baseband stage circuits can be considered to be provided as part of the antenna system blocks 12, 14, 16, or may be considered to be part of the associated control system 18 that controls the operation of the various antenna systems, and the interactions between them. The control system 18 will provide all of the required control functionality for the different antenna systems, as well as controlling the routing of signals between the antenna systems so that signals received via the first and second antenna systems from items of user equipment can be routed through the third antenna system over the backhaul link to the network, and conversely signals to be propagated to those items of user equipment that are received over the backhaul link by the third antenna system can be routed to the appropriate first and second antenna systems for transmission to the required items of user equipment.

It should be noted that FIG. 1 is not intended to illustrate how the various components are laid out within the combined access and backhaul unit 10, but instead is merely a schematic illustration of the different antenna systems and associated control system. By way of example, whilst the third antenna system 16 is shown above the second antenna system 14, in one embodiment the second and third antenna systems are actually placed side by side, and hence when considering the vertical elevation view of the apparatus 10 as shown in FIG. 1, one of the second and third antenna systems would reside behind the other.

Figure 2:
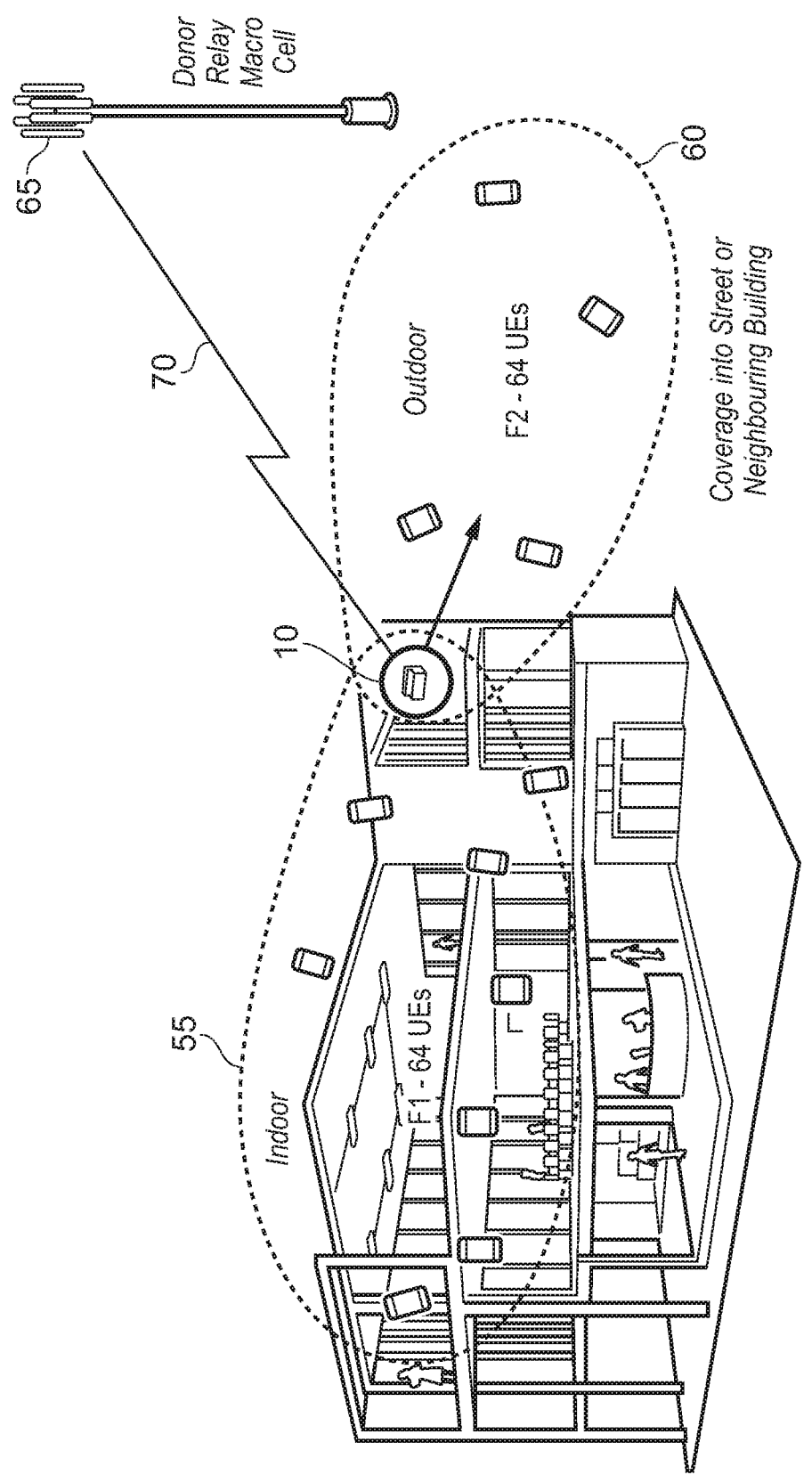
FIG. 2 illustrates how the combined access and backhaul unit creates indoor and outside sectors in accordance with one example.

FIG. 2 schematically illustrates how the apparatus 10 may be used to establish both indoor and outdoor sectors for connection of items of user equipment. In particular, as shown, the combined access and backhaul unit 10 can be arranged to produce a first sector 55 of coverage through the beam pattern(s) employed by the first antenna system, and in addition can create an outdoor sector of coverage 60 through the beam pattern(s) deployed by the second antenna system 14. A common wireless backhaul link 70 can then be established by the third antenna system 16 communicating with a macro base station 65, also referred to herein as a donor relay macrocell, or a donor eNodeB (DeNB).

The first, second and third antenna systems can be arranged in a variety of ways, but in one embodiment each of those three antenna systems comprises an array of antenna elements, which are configured in a manner to allow an increase in spectral efficiency of the network when items of user equipment connect to the network via the apparatus 10 rather than connecting directly to a macro base station such as the illustrated base station 65. Since the apparatus is not a handheld device like normal items of user equipment, it is not constrained by size and power factors that would typically constrain the antennas within such handheld user devices. Hence, the array of antenna elements used in the various first, second and third antenna systems can be provided with characteristics that allow a more efficient modulation of signals than may be possible using the antenna system of an item of user equipment connecting to the apparatus 10.

For example, more antenna elements may be provided within each of the arrays, those antenna elements can be of a larger size, the antenna elements may be operated with higher power, and/or may be configured to provide higher gain, than would typically be the case for antenna elements within handheld items of user equipment. As a result, it has been found that a significant number of items of user equipment can connect to each combined access and backhaul unit 10, whilst providing good quality links into the network through the common wireless backhaul link 70. This can lead to a significant increase in the overall spectral efficiency of the network when compared with the situation where each of those items of user equipment individually connected to a macro base station of the network, for example by allowing more efficient modulation schemes to be used for the communications. In one embodiment up to 128 items of user equipment may be connected into each combined access and backhaul unit 10, and as schematically illustrated in FIG. 2 this could for example allow 64 items of user equipment to connect via the indoor sector 55 and another 64 items of user equipment to connect via the outdoor sector 60.

Figure 3:
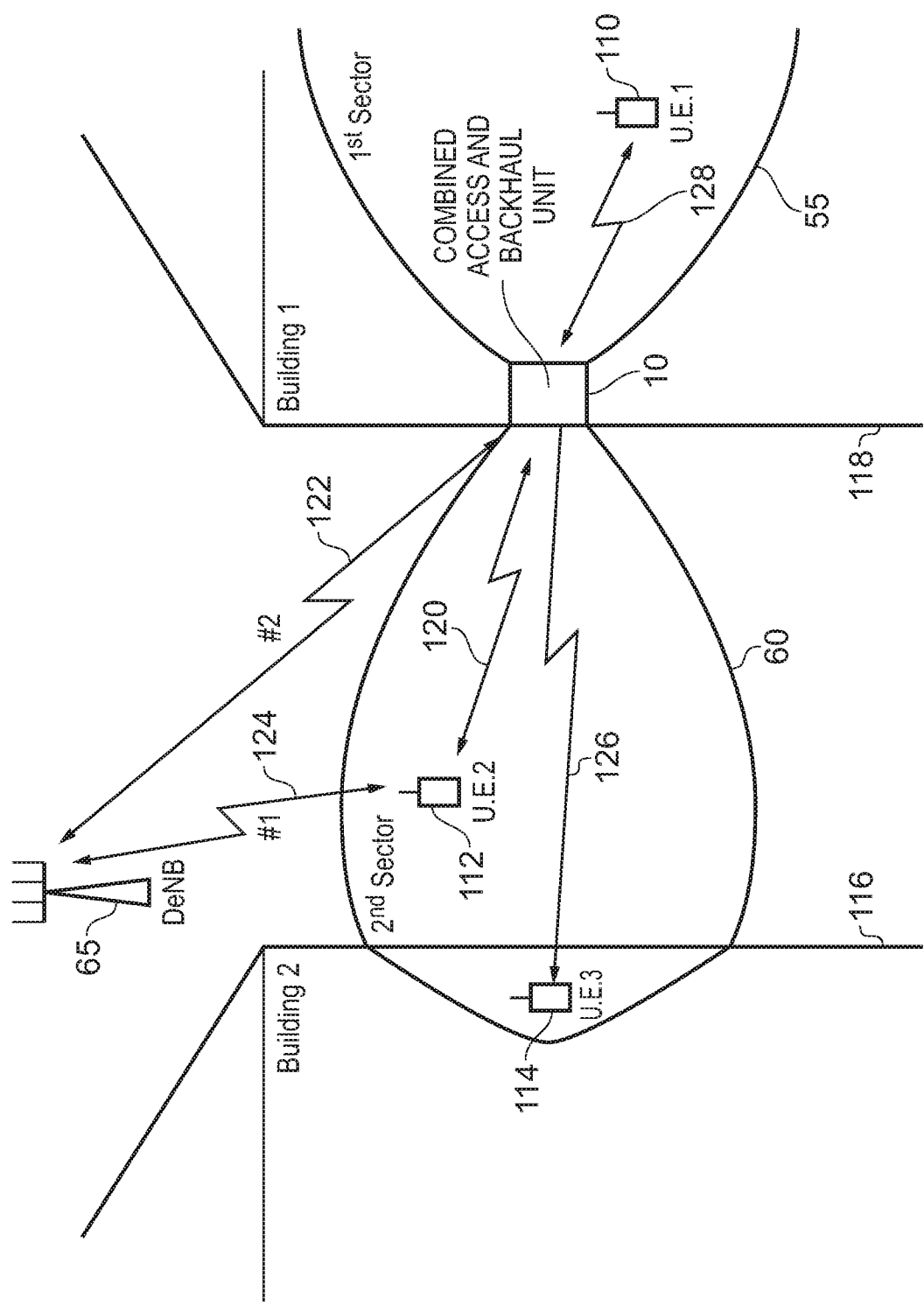
FIG. 3 illustrates how users may connect to the network using the combined access and backhaul unit.

FIG. 3 schematically illustrates an urban environment in which a combined access and backhaul unit 10 is located on a windowsill in a first building 118, that first building 118 being positioned opposite to an adjacent building 116. External to both buildings a donor eNodeB (DeNB) 65 is provided to form a macro base station of the network. The combined access and backhaul unit 10 creates a first sector 55 of coverage through use of the first antenna system, and a second sector 60 of coverage that propagates into the open space external to the building. As schematically shown in FIG. 3 the second sector may in one embodiment extend far enough that it permeates inside the second building 116.

Considering first the item of user equipment 112 that is being operated externally to both buildings, this item of user equipment may have the option to connect directly to the donor eNodeB 65 as illustrated schematically by the communication path 124. However, through the provision of the combined access and backhaul unit 10, it also has the option to connect into the network via the unit 10, and in particular can establish a connection 120 with the second antenna system. If this route is taken, then the connection into the network will occur through the combination of the communication link 120 and the common backhaul link 122 provided by the third antenna system.

In some instances, it may be the case that the quality of the connection between the item of user equipment 112 and the second antenna system of the combined access and backhaul unit 10 is better than the quality of the communication link 124, and as a result the item of user equipment 112 may decide to connect to the unit 10, rather than directly to the donor eNodeB 65. For instance, the link 120 may allow a more efficient modulation scheme to be used than would be the case for the link 124. Provided a high performance backhaul link 122 can also be provided, then overall an improvement in spectral efficiency may be achieved by the item of user equipment 112 connecting into the network via the paths 120, 122, rather than directly over path 124.

It should be noted that this benefit may also be available to the item of user equipment 114 within the second building 116, in situations where that item of user equipment falls within the coverage area of the second sector 60. Accordingly, it may choose to access the network via the communication link 126 with the second antenna system 14, with the unit 10 then completing the connection into the network via the common backhaul link 122. In particular, due to the relative location of the second building 116 and the donor eNodeB 65, it may be that the item of user equipment 114 only obtains a relatively poor connection directly to donor eNodeB 65, whereas it may be able to make a higher quality connection 126 with the combined access and backhaul unit 10.

As also shown in FIG. 3, an item of user equipment 110 within the first sector 55 may connect into the donor eNodeB 65 via the combined access and backhaul unit 10, using a communication link 128 to the first antenna system, and with the unit 10 then using the common wireless backhaul link 122 to connect that item of user equipment 10 into the network.

In one embodiment, the frequency channel (i.e. frequency) used for communicating over the wireless backhaul link 122 is the same as the frequency channel used when items of user equipment connect directly to the donor eNodeB, and hence the same frequency channel will also be used for a connection made via path 124. However, the frequency channel used for communications between items of user equipment and the first and second antenna systems 12, 14 may in one embodiment be a different frequency channel to the frequency channel used for the communication links 122, 124. This can serve to mitigate interference between the communications within the first and second sectors 55, 60 using the first and second antenna systems 12, 14, and the communication links with the macro base station. However, in one embodiment, it is possible for all of these communication links to be provided within the same frequency band, hence allowing in-band access and backhaul links to be established.

Figure 4:
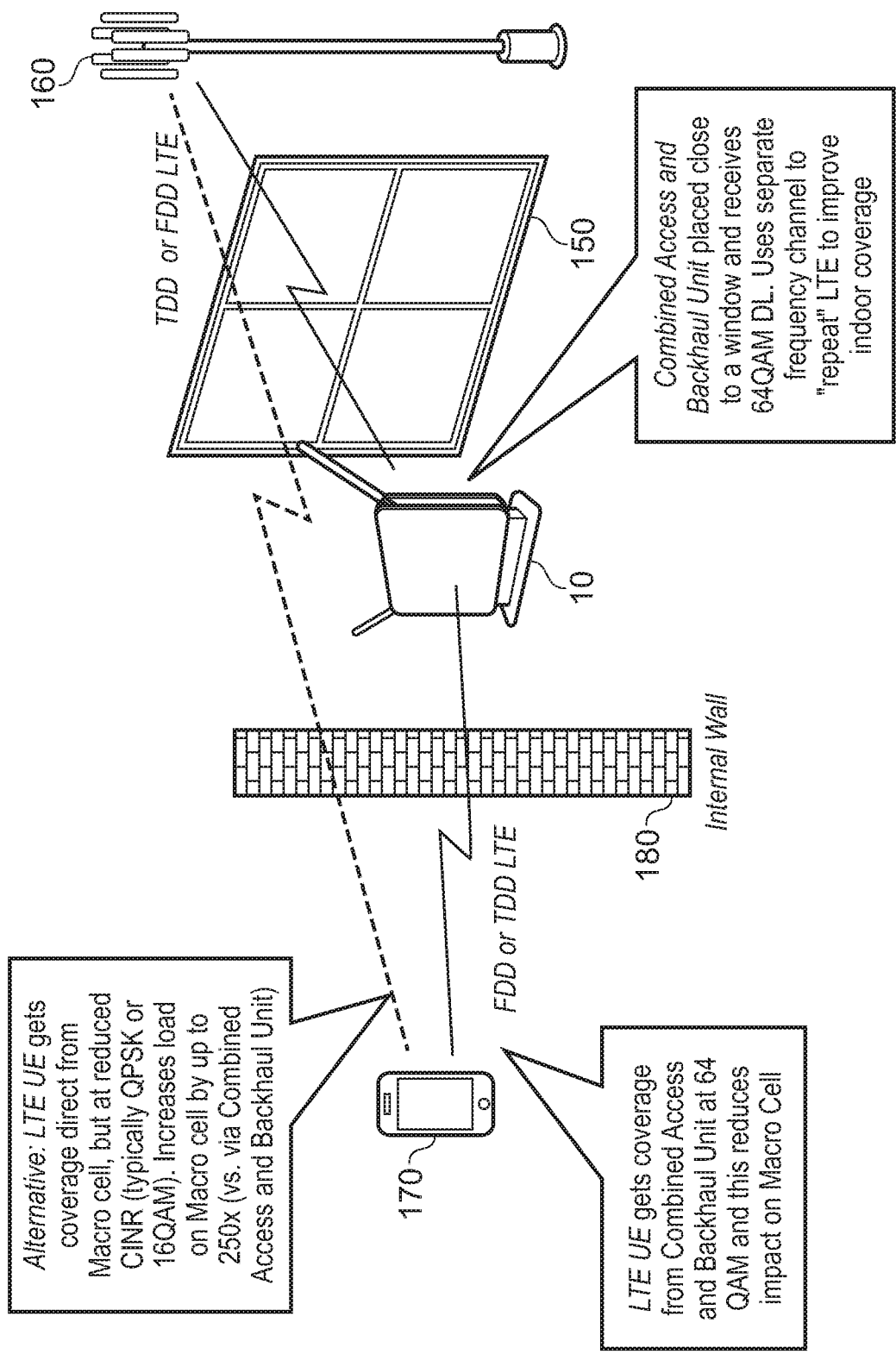
FIG. 4 schematically illustrates how improved spectral efficiency may be achieved when an item of user equipment connects to the network via the combined access and backhaul unit.

FIG. 4 schematically illustrates how the use of the combined access and backhaul unit 10 can improve the overall quality of the connection for an item of user equipment. In this example, an indoor scenario is considered, where the unit 10 establishes a backhaul communication link with the macro base station 160 through the window 150. It is assumed here that an item of user equipment 170 within the building has the possibility of making a direct connection with the macro base station 160, but that various attenuating factors such as the internal wall 180, the window 150, etc, mean that the direct link is of a relatively poor quality, hence requiring relatively inefficient modulation schemes such as QPSK or 16QAM to be used. However, it is assumed that the wireless backhaul link can use a much more efficient modulation scheme such as 64QAM, and that similarly that more efficient modulation scheme can also be used for communications between the unit 10 and the item of user equipment 170. As a result, it is more spectrally efficient for the item of user equipment 170 to connect to the macro base station 160 via the combined access and backhaul unit 10, since through this connection method there is less overall impact on the macro cell, and hence overall spectral efficiency of the network can be increased.

It has been found that the use of the combined access and backhaul unit 10 can improve the spectral efficiency of the network in many situations, but provides particularly enhanced improvements in spectral efficiency and user equipment performance when deployed in the middle to outer regions of a coverage area of a macrocell provided by a DeNB.

Figure 5:
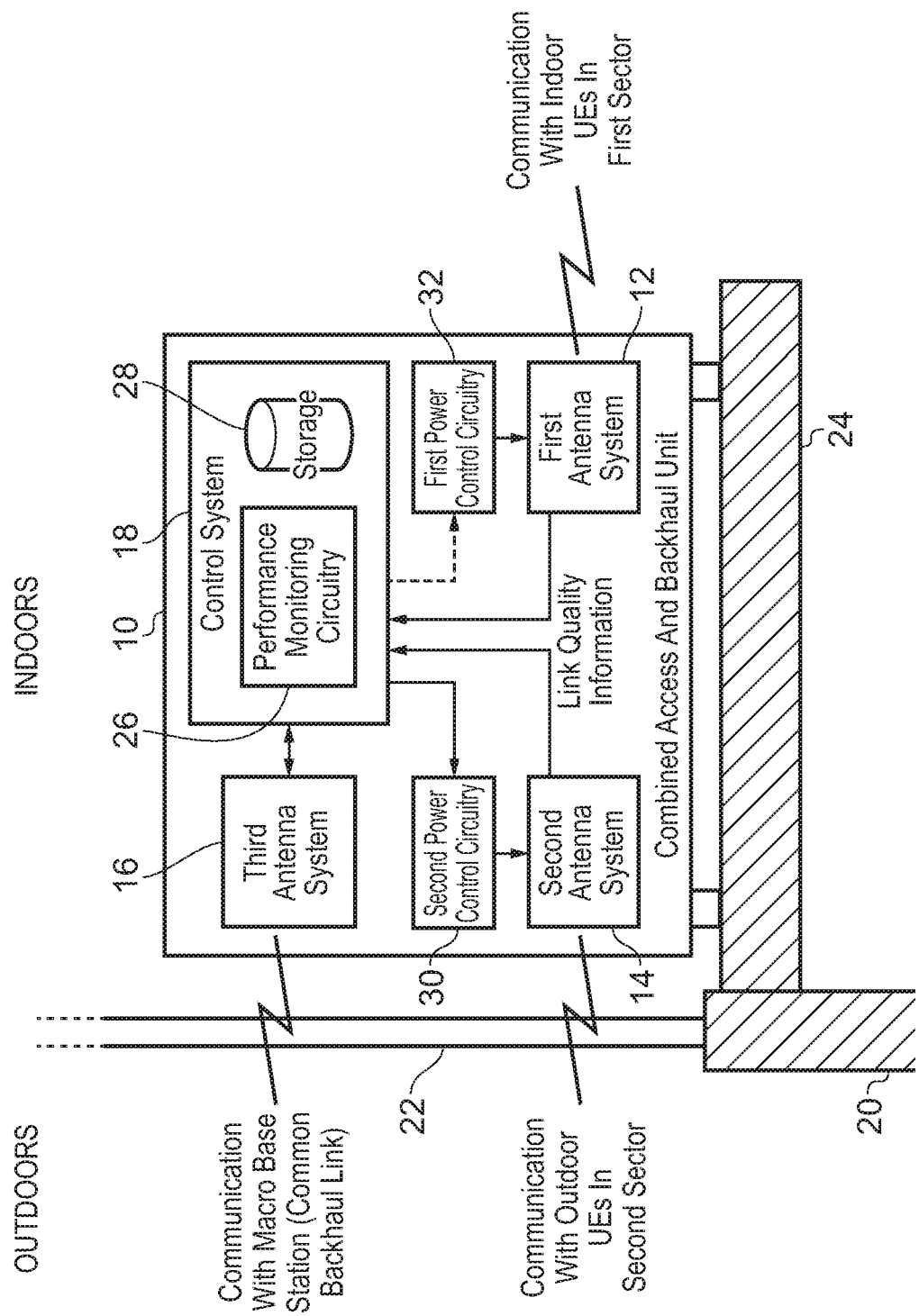
FIG. 5 shows a block diagram illustrating in more detail the combined access and backhaul unit in accordance with an example of the present technique.

FIG. 5 illustrates in more detail the configuration of the combined access and backhaul unit 10 in one example implementation. As can be seen, the apparatus 10 includes the components discussed earlier with reference to FIG. 1, but FIG. 5 further shows: performance monitoring circuitry 26, storage 28, second power control circuitry 30, and optional first power control circuitry 32. Furthermore, the first antenna system 12 and the second antenna system 14 are arranged to provide link quality information received from items of user equipment in the respective sectors to the control system 10.

The performance monitoring circuitry is configured to monitor at least one performance characteristic of the wireless backhaul link between the third antenna system and the base station. The performance characteristic may be measured in terms of a number of different parameters but in one embodiment are indicative of the spectral efficiency of the connection between the third antenna system 16 and the base station. The performance monitoring circuitry assesses the performance characteristic to determine whether usage of at least one of the sectors should be adjusted. This assessment may be by way of a comparison against predetermined performance thresholds stored in the storage 28. When it is determined that the usage of a sector should be adjusted, the control system utilises either, or both, of the first power control circuitry 32 and the second power control circuitry 30 to adjust a signal strength of signals transmitted by the relevant one of the antenna systems until sector usage reaches an appropriate level according to the performance characteristic. The storage 28 may be further configured to store usage data that is indicative of the extent to which sector usage is to be adjusted relative to the monitored performance characteristic. The performance monitoring circuitry is also arranged to account for the effect that adjusting usage of a particular sector will have on the items of user equipment within that sector. This is achieved by virtue of the link quality information, which may be received from an item of user equipment within either sector and is indicative of a connection quality of an alternative connection option available to that item of user equipment.

It will be appreciated that in some examples the apparatus 10 may not comprise the first power control circuitry 32 and may exclusively adjust sector usage of the second sector using the second power control circuitry.

Figure 6:
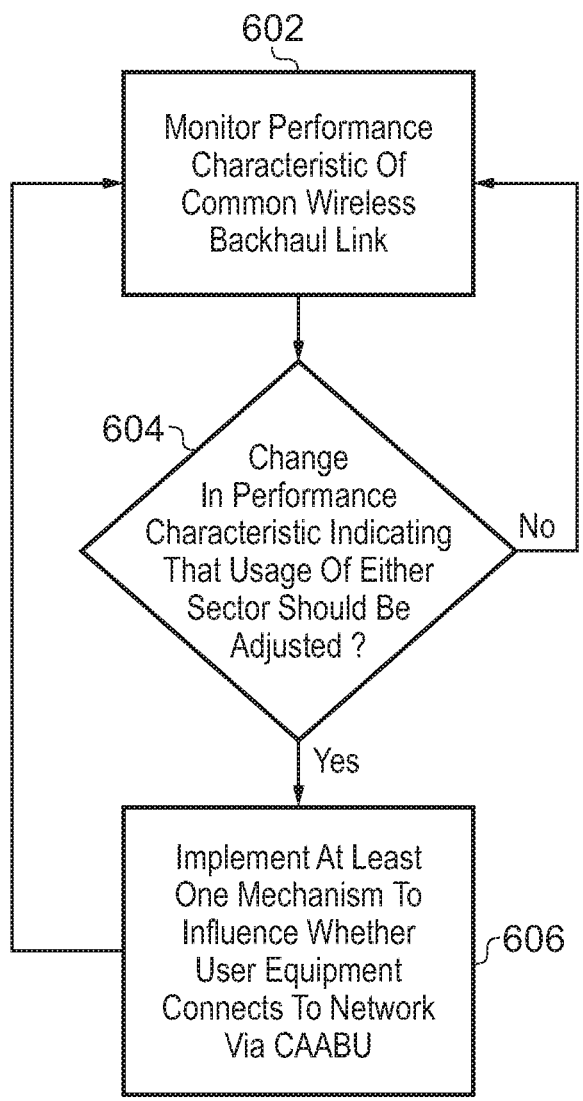
FIG. 6 illustrates a process according to the present technique to be implemented on a combined access and backhaul unit.

FIG. 6 illustrates a process according to the present technique that can be implemented on the combined access and backhaul unit 10. The process generally cycles between step 602, where a performance characteristic of the common wireless backhaul link is monitored, and step 604, where it is determined whether a change in the performance characteristic indicates that usage of either sector should be adjusted. When it is determined in step 604 that a change in the performance characteristic does indicate that usage of either sector should be adjusted, the process proceeds to step 606. In step 606, at least one mechanism to influence whether items of user equipment connect to the network via the combined access and backhaul unit 10 is implemented. The process then returns to step 602.

Figure 7A:
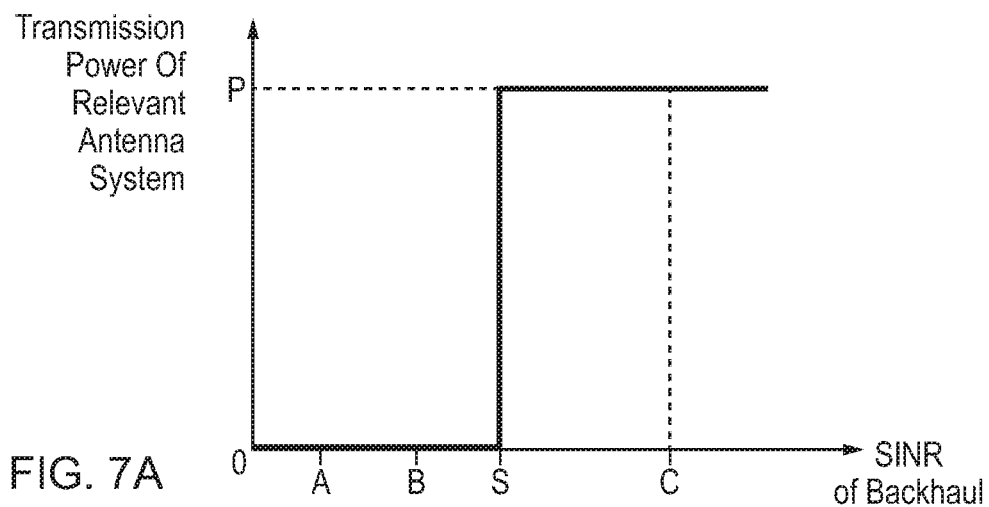
FIGS. 7A, 7B and 7C show three example configurations for assessing a performance characteristic of a wireless backhaul and determining when to implement a mechanism to influence sector usage.
Figure 7B:
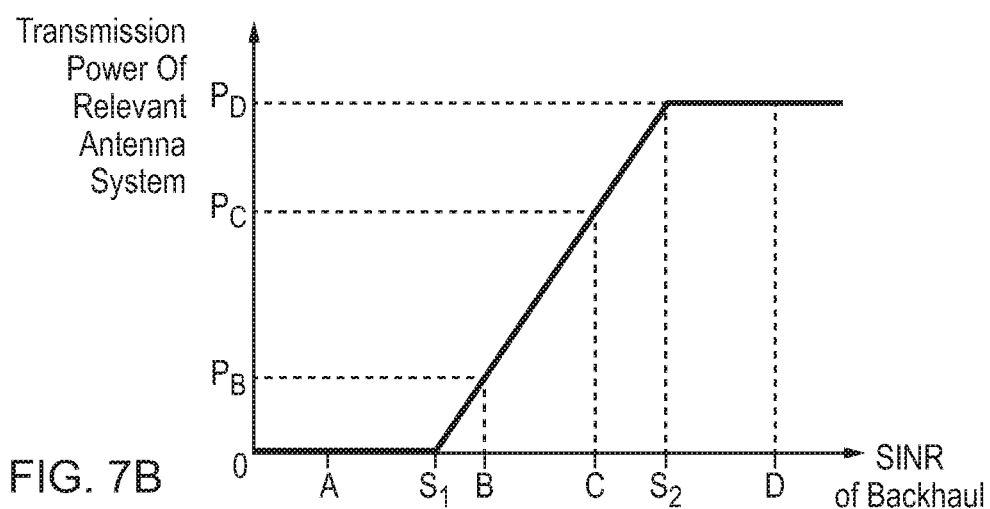
Figure 7C:
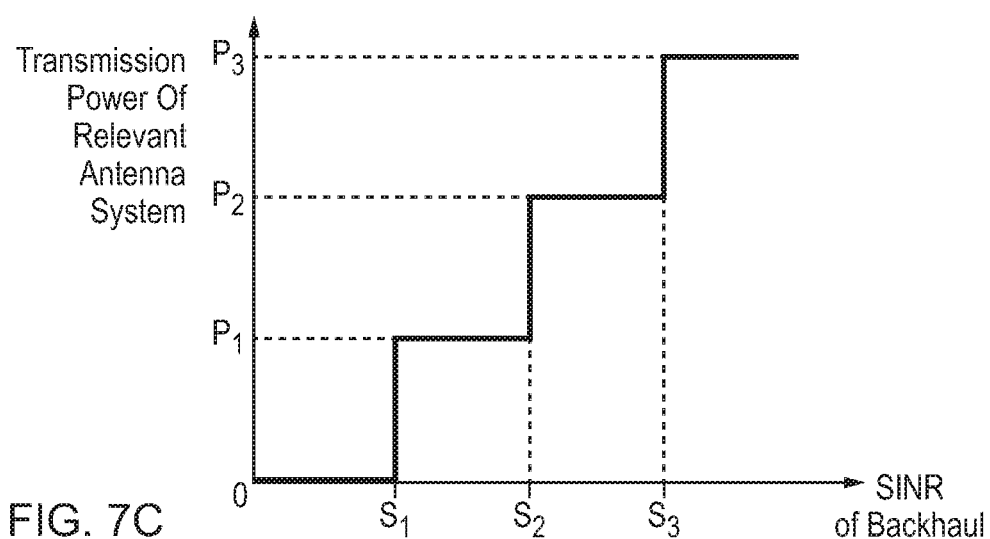

FIGS. 7A-7C show three exemplary techniques of how it may be determined when the performance characteristic indicates that usage of a sector is to be adjusted, and the mechanism that can be implemented in order to adjust sector usage. These techniques are suitable for implementation in step 604 and step 606 of the process of FIG. 6 for example.

In the examples of FIGS. 7A-7C the performance characteristic of the wireless backhaul is accessed in terms of the SINR of the wireless backhaul. However, it will be appreciated that other parameters of the wireless backhaul may also be monitored. For example, when monitoring the wireless backhaul link, the combined access and backhaul unit 10 may additionally, or alternatively, monitor a reference signals received power, a throughput of the apparatus, or any other parameter indicative of the spectral efficiency of the connection between the third antenna system 16 and the base station.

It will be appreciated that the configurations of FIGS. 7A-7C may be applied to either or both of the antenna systems of the combined access and backhaul unit 10. However, for simplicity the description of the configurations that follows will be made with reference to the second antenna system 14 such that usage of the second sector is influenced.

FIG. 7A shows a binary 'on/off' mechanism, with a threshold corresponding to a minimum backhaul SINR 'S'. As can be seen, the transmission power of the second antenna system of a apparatus 10 is arranged to either be at 0, or power level 'P' based on the SINR of the wireless backhaul of the apparatus 10. In some examples, the power level 'P' may correspond to a maximum transmission power of the second antenna system 14.

If the apparatus 10 exhibits a low SINR of the wireless backhaul, indicative of a poor spectral efficiency, the apparatus 10 is configured to set the transmission power of the second antenna system 14 to zero. This prevents any items of user equipment from connecting to the second antenna system 14 and being exposed to a poor connection corresponding to a backhaul SINR less than 'S'. However, if the SINR of the wireless backhaul improves to a level greater than or equal to 'S', the apparatus 10 is configured to set a transmission power of the second antenna system 14 to 'P'. At power 'P', a second sector will be provided by the second antenna system 14, and items of user equipment within that sector will then be able to connect to the network via the second antenna system 14. 'S' is thus a performance threshold that defines the minimum backhaul link quality deemed appropriate for items of user equipment to connect to the network via the second antenna system of the apparatus 10.

The configuration of FIG. 7A may be implemented in step 604 of the process of FIG. 6 to determine when a change in the performance characteristic indicates that usage of either sector should be adjusted. For example, consider that when initially monitoring the performance characteristic of the wireless backhaul link, the wireless backhaul link exhibits a SINR of 'A' as shown in FIG. 6A. In this case, the apparatus 10 will be configured to set the transmission power of the second antenna system to 0. If the wireless backhaul link were to improve from 'A' to 'C', then in step 504 it is determined that the change indicates that usage of the second sector should be allowed. As such, the apparatus 10 is configured to increase the transmission power to level 'P'. On the other hand, if the backhaul SINR remains at 'A', or changes from 'A' to 'B', in step 604 it is determined that the change in performance does not indicate that usage of the second sector should be adjusted, and as such the transmission power of the second antenna system 10 is kept at 0.

FIG. 7B shows a linear function mechanism, with two different threshold SINR values. A first threshold '$S_1$' is provided, below which the transmission power of the second antenna system 14 is to be set at 0, and a second threshold '$S_2$' is provided, above which the transmission power of the second antenna system 14 is to be set a power level '$P_D$'. Between thresholds '$S_1$' and '$S_2$' the transmission power of the second antenna system is determined as a linear function of the SINR of the wireless backhaul. As can be seen, an improvement in the SINR of the wireless backhaul from 'A' to 'B' corresponds to an increase in transmission power from 0 to power level '$P_B$'. Similarly, an improvement in the SINR of the wireless backhaul from 'B' to 'C', or from 'B' to 'D', corresponds to an increase in the transmission power from '$P_B$' to '$P_C$' and '$P_B$' to '$P_D$' respectively. The configuration shown in FIG. 6B provides improved flexibility and allows for more precise mechanism that can be implemented to accurately influence whether items of user equipment connect to the network via the relevant antenna system of the apparatus.

FIG. 7C shows a step function mechanism, with three different threshold SINR values of the wireless backhaul. A first threshold '$S_1$' is provided, below which the transmission power of the relevant antenna system is to be set at 0. A second threshold '$S_2$' is also provided, and when the SINR of the wireless backhaul is between '$S_1$' and '$S_2$' the transmission power of the relevant antenna system is to be set at power level '$P_1$'. Similarly, when the SINR of the wireless backhaul is between '$S_2$' and '$S_3$' the transmission power is to be set at power level '$P_2$'. Alternatively, when the SINR of the wireless backhaul is equal to or greater than threshold '$S_3$' the transmission power is to be set at power level 'P$_3$'. The step function configuration shown in FIG. 6C has the advantage of being relatively straightforward to implement whilst also affording a degree of control over whether items of user equipment connect to the network via the antenna system of the apparatus.

Figure 8:
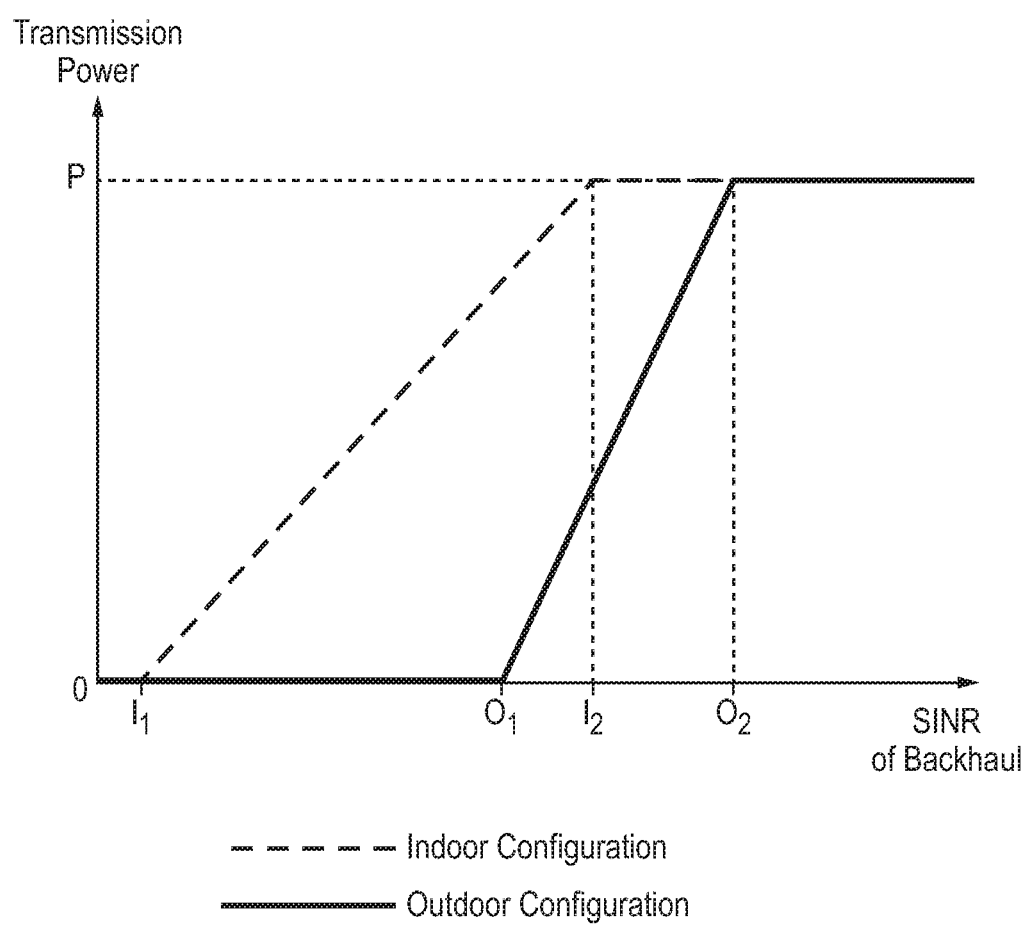
FIG. 8 illustrates how different configurations may be implemented in association with a first antenna system and a second antenna system of the combined access and backhaul unit.

FIG. 8 shows an example of two linear function mechanism, the mechanisms corresponding to an indoor sector provided by the first antenna system 14 of the apparatus 10 and an outdoor sector provided by the second antenna system 12 of the apparatus 10. As can be seen, both the indoor configuration and the outdoor configuration include a minimum SINR threshold, 'I$_1$' and 'O$_1$' respectively. However, the indoor threshold 'I$_1$' is set at a lower level than the outdoor threshold SINR 'O$_1$'. This in effect prioritises items of user equipment within the indoor sector as the first antenna system 12 providing the indoor sector will not be set to a transmission power of 0 as readily as the second antenna system 14 providing the outdoor sector. As such, items of user equipment within the indoor sector will be less inhibited from connecting to the network via the apparatus 10 than items of user equipment within the outdoor sector. A similar arrangement is implemented with respect to the upper thresholds 'I$_2$' and 'O$_2$' as the first antenna system 12 providing the indoor sector will be set to transmission power 'P' more readily than the second antenna system 14 providing the outdoor sector. Arranging the apparatus 10 to implement the configurations illustrated in FIG. 8 allows a greater degree of control over the servicing of items of user equipment in each sector, and allows for items of user equipment in one sector to be prioritised over the other. This may be appropriate when, for example, the apparatus is to be deployed within an office building, in which the owner of the apparatus desires their employees within the building to be prioritised over public users at street level.

FIGS. 9A-9D illustrate one example of a combined access and backhaul unit 10 that implements the linear function configuration described with reference to FIG. 7B, and shows the sequence of events that occur as the SINR of the wireless backhaul decreases. The urban environment of FIGS. 9A to 9D is similar to that shown in FIG. 3, with the apparatus 10 located at a periphery of building 1 and providing a first sector 55 through use of the first antenna system and a second sector 65 through use of the second antenna system. However, the urban environment of FIGS. 9A to 9D further comprises building 3, which contains another apparatus 900 according to the present technique.

Figure 9A:
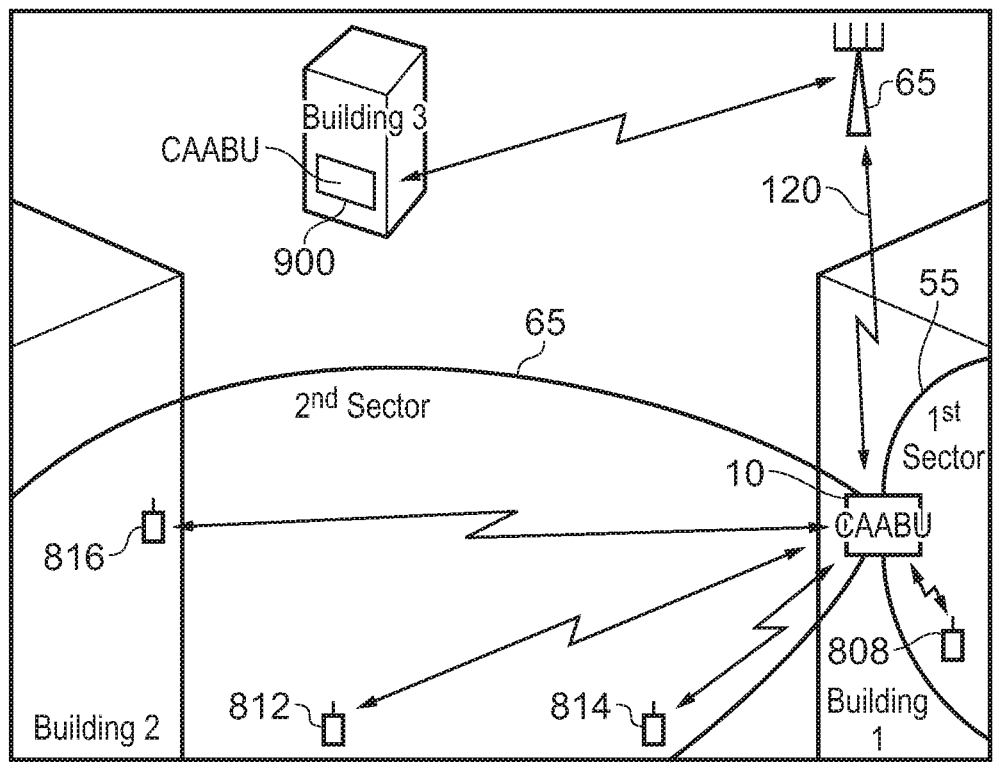
FIGS. 9A, 9B, 9C and 9D illustrate a sequence of events that may occur in a network infrastructure when the combined access and backhaul unit implements measures to influence whether items of user equipment connect to the second antenna system.

As can be seen in FIG. 9A, the apparatus 10 is deployed at a periphery, such as a window sill, of building 1 such that a first sector 55 extends into building 1 to provide enhanced availability of the network to items of user equipment within the building such as U.E. 808. The apparatus 10 also provides a second sector 65 that extends externally to building 1 to provide enhanced availability of the network to other items of user equipment at street level, such as U.E. 812 and U.E. 814. Furthermore, the second sector also extends into building 2, where U.E. 816 resides. In the example of FIG. 9A, the apparatus 10 provides a better quality connection to U.E. 816 than the other available connection options, and thus U.E. 816 connects to the network via the apparatus 10.

Initially, the wireless backhaul link 120 exhibits a good performance characteristic. That is, a SINR measurement indicates that the current SINR of the wireless backhaul link 120 is at 'D' as shown in FIG. 7B. Therefore, the apparatus 10 is configured to set a transmission power of its second antenna system to maximum level 'P$_D$', and thus provide a second sector 65 of relatively large magnitude. Therefore, enhanced availability is provided to items of user equipment at street level, such as U.E. 812 and U.E. 814, as well as to U.E. 816 within building 2. Thus all of the items of user equipment in the example of FIG. 9A are able to connect to the network via either the first antenna system or the second antenna system of the apparatus 10. Furthermore, when the wireless backhaul link 120 exhibits a good performance characteristic, as is the case in FIG. 9A, the quality of the connection between any of the items of user equipment of FIG. 9A may be better than the quality of any connection that could be made directly to DeNB 65. This may either be due to the fact that the signals propagated by the DeNB do not penetrate buildings very well, thus limiting the connection quality available to U.E. 808 and U.E. 816, or because at street level there are various obstructions that create a shadow in which the signal propagated by the DeNB cannot reach items of user equipment such as U.E. 812 and U.E. 814, or reaches them but with poor quality.

Figure 9B:
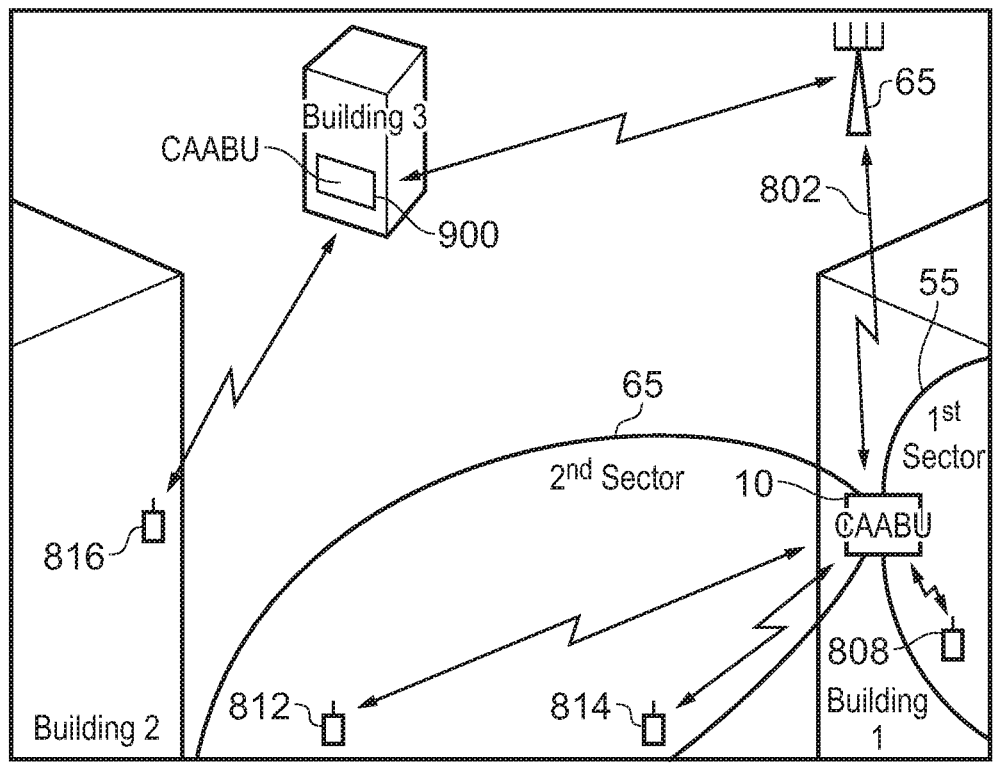

FIG. 9B shows the effect of a decrease in the performance characteristic of the wireless backhaul link 120. That is, during monitoring of the wireless backhaul link 65, the apparatus 10 determines that the SINR has dropped from 'D' to 'C'. As such, the apparatus 10 also determines that some measure needs to be taken to influence whether items of user equipment connect to the network via the apparatus 10. In this case, this is achieved by decreasing the transmission power of the second antenna system to a power level 'P$_C$'. The effect of this can be seen in FIG. 9B as the second sector 65 shrinks in magnitude, and no longer extends to provide enhanced availability of the network to U.E. 816. Consequently, U.E. 816 seeks an alternative connection to the network. The two available options include connecting to the other apparatus 900, and connecting directly to DeNB 65. The U.E. 816 may not make any distinction between the other apparatus 900 and the DeNB 65 as both may simply appear as base stations. Therefore, U.E. may simply connect to which ever device appears to provide the best available connection, and in the case of FIG. 9B, connects to apparatus 900. Similarly, the DeNB makes no distinction between the apparatus 10, the apparatus 900, and the items of user equipment, all of which appear to the DeNB as devices which require network access.

Figure 9C:
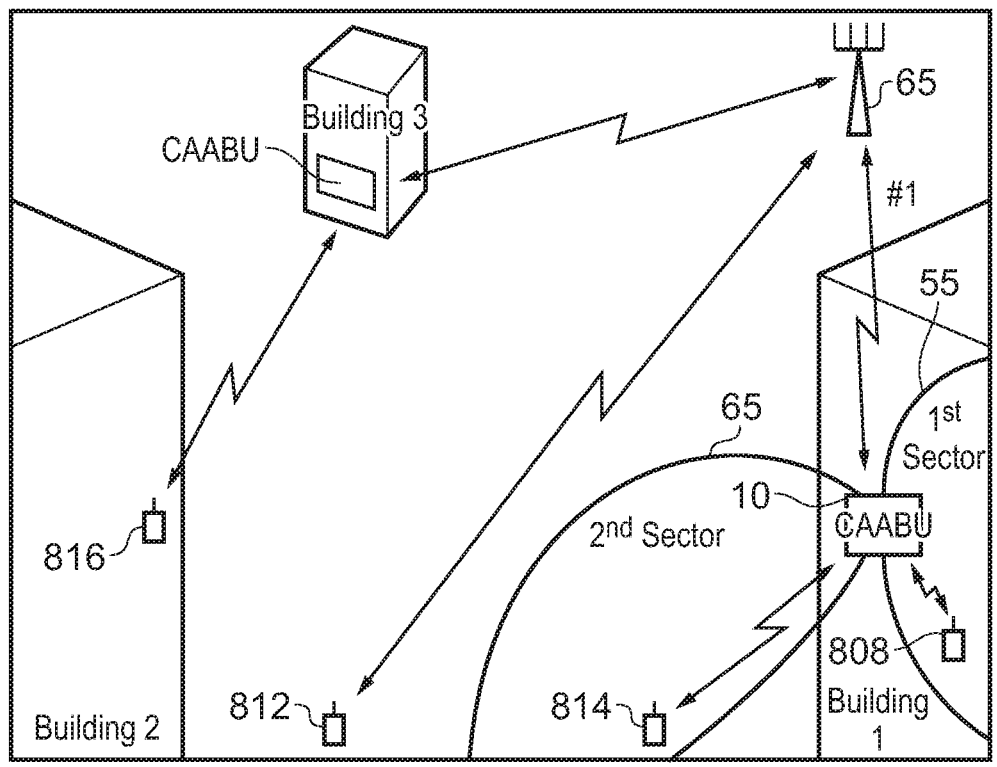

FIG. 9C shows the effect of a further decrease in the performance characteristic of the wireless backhaul link 120. That is, during monitoring of the wireless backhaul link 65, the apparatus 10 determines that the SINR has dropped further from 'C' to 'B'. Thus a further reduction in the transmission power of the second antenna system is appropriate, and the apparatus 10 reduces the transmission power from power level 'P$_C$' to 'P$_B$' shown in FIG. 7B. As a result, the second sector 65 shrinks further in magnitude and also no longer extends to provide enhanced availability of the network to U.E. 812. As U.E. 812 is not within a building, the signals propagated from the DeNB appear to have a greater spectral efficiency than those which must penetrate building 2 in order to reach U.E. 816. Therefore, in contrast to U.E. 816, connecting directly to DeNB 65 for network access provides the best quality connection option for U.E. 812.

Figure 9D:
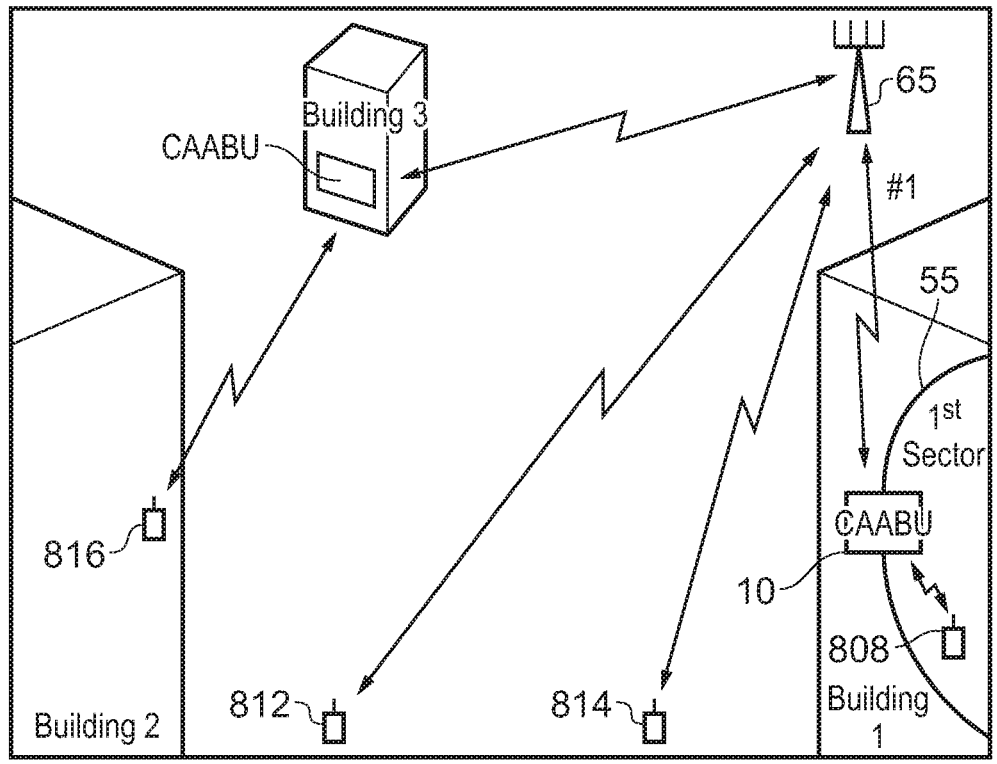

FIG. 9D shows the effect of even further decrease in the performance characteristic of the wireless backhaul link 120. That is, in FIG. 9D the apparatus 10 determines that the SINR has dropped from 'B' to 'A', and is now lower than the minimum SINR threshold 'S$_1$'. A SINR as low as this indicates a connection quality poor enough that the second antenna system should be switched off. The effect of this is two fold. Firstly, if the second sector was not turned off, the availability of such poor connectivity would decrease the overall quality of service of the network infrastructure as perceived by items of user equipment. Secondly, by turning the second sector off, all of the backhaul resources are dedicated to the first sector, and the connection quality provided by the apparatus 10 to items of user equipment within the indoor sector inherently improves. For example, the amount of bandwidth of the backhaul that is available to each item of user equipment connected to the apparatus 10 increases as items of user equipment within the second sector are no longer making use of the backhaul. As such the apparatus 10 is configured to set the transmission power of the second antenna system to 0 such that a second sector is not provided at all. Therefore, all of the items of user equipment external to the building make alternative connections to the network, either via apparatus 900, or directly to the DeNB 65.

Figure 10:
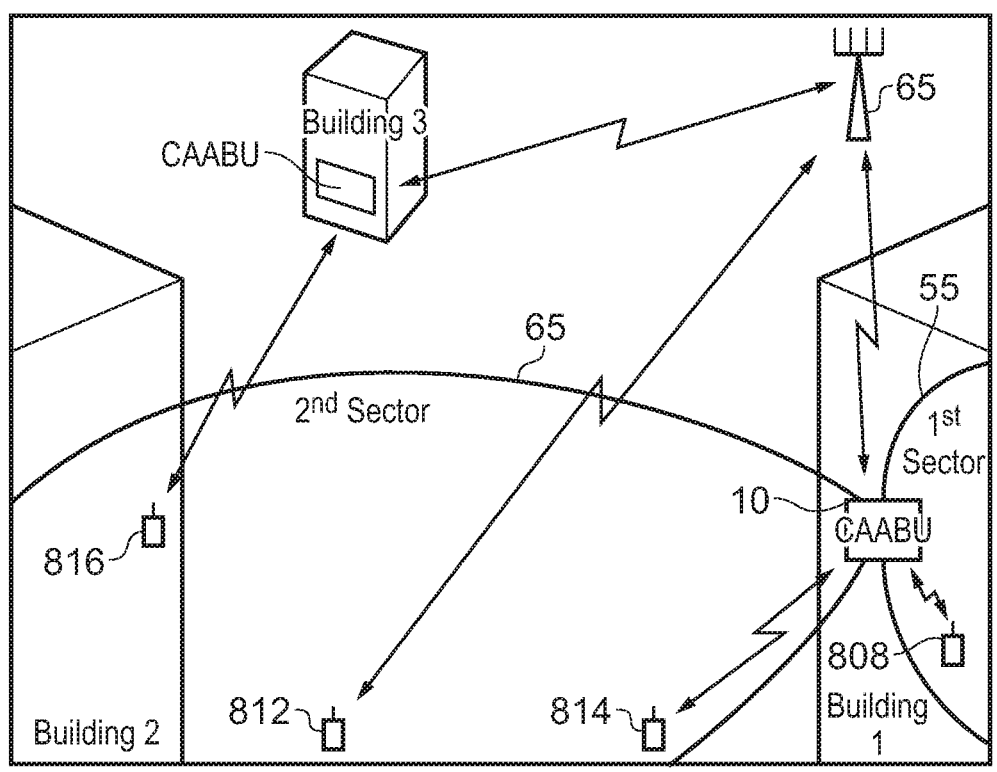
FIG. 10 illustrates another example of how the combined access and backhaul unit can influence whether items of user equipment connect to an antenna system.

FIG. 10 shows another example of how apparatus 10 may influence whether items of user equipment connect to the network via an antenna system of the apparatus 10. As can be seen from FIG. 10, the second sector 65 extends to cover all the items of user equipment at street level (U.E. 812 and U.E. 814), as well as U.E. 816 in building 3. However, U.E. 816 is actually connected to other apparatus 900 in building 3, and U.E. 812 is actually connected to DeNB 65. This arrangement can be achieved through the use of connection throttling messages transmitted to the items of user equipment, which indicate to at least some of the items of user equipment that they are no longer to connect to the network via apparatus 10. The connection throttling messages may be targeted connection throttling messages that are uniquely transmitted to U.E. 816 and U.E. 812, whilst in absence of a targeted connection throttling message, U.E. 814 is allowed to remain connected to apparatus 10. Alternatively, the connection throttling messages may be global, and each item of user equipment may respond to the global message in dependence on its particular current configuration. For example, the items of user equipment may determine whether or not to disconnect from the apparatus 10 in response to a global connection throttling message in dependence on the quality of alternative available connections.

Figure 11:
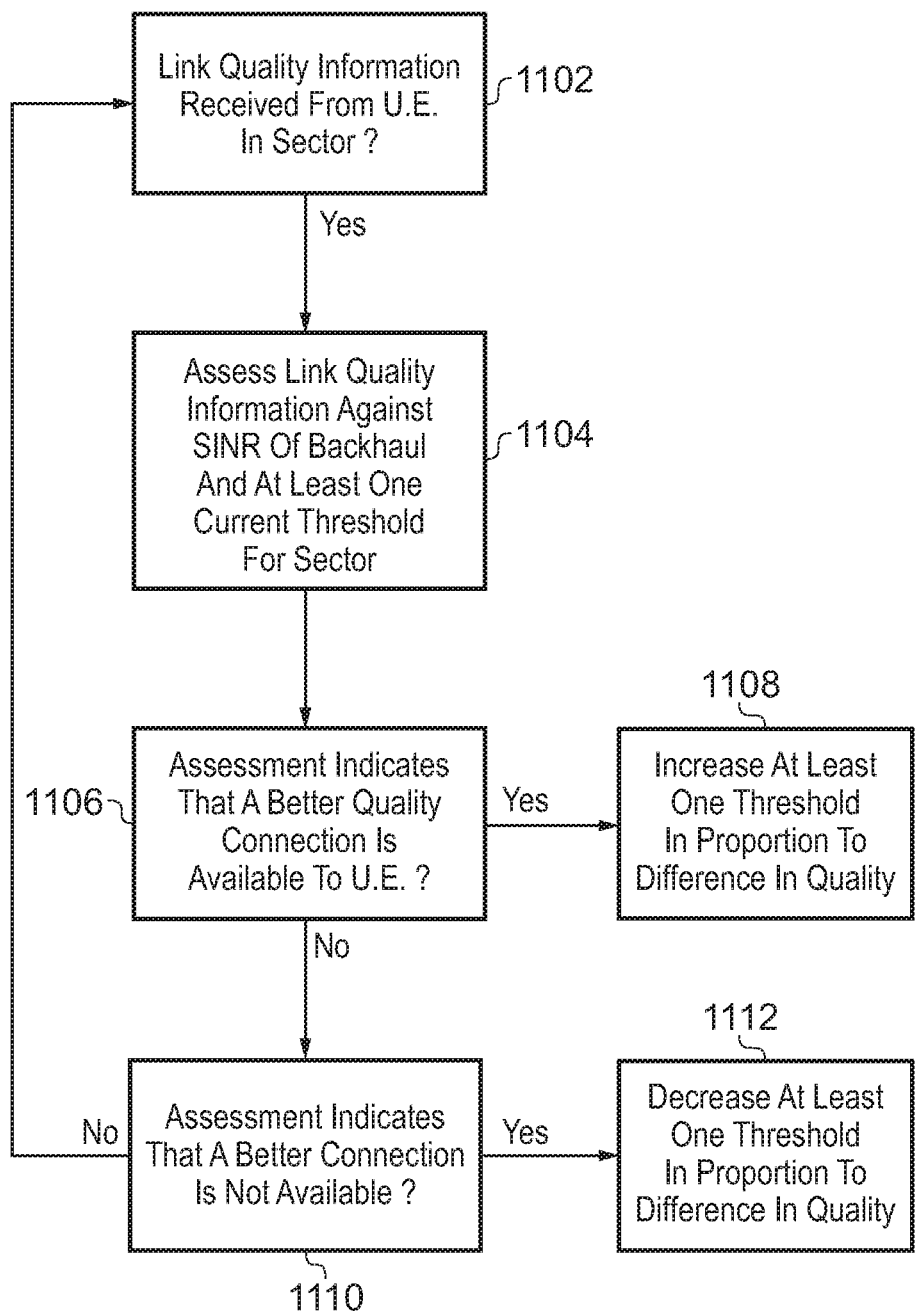
FIG. 11 illustrates a process for determining when to adjust thresholds of the configurations of FIGS. 7A to 7C.

FIG. 11 shows a process that may be used in one embodiment to determine when to adjust the thresholds stored in the threshold storage 28 of FIG. 5 based on link quality information. The link quality information is indicative of a connection quality of at least one alternative connection option available to an item of user equipment. In some examples, the link quality information comprises a handover measurement that is obtained by items of user equipment during a handover procedure used to assess which base station or combined access and backhaul unit to use.

The process initially idles at step 1102 awaiting the receipt of link quality information from items of user equipment in either sector. Where link quality information is received from multiple items of user equipment, that link quality information may be aggregated in a suitable manner to provide indicative link quality information for the relevant sector. When link quality information is received, the process proceeds to step 1104 where the link quality information is assessed against the current SINR of the wireless backhaul connection between the third antenna system and the macrocell, and at least one of the current thresholds for the relevant sector. In step 1106 it is determined whether the assessment indicates that a better quality connection may be available to at least a subset of the items of user equipment. If this is the case, then in step 1108 at least one of the thresholds applied to the relevant sector is increased, for example in proportion to the difference in the connection quality between the alternative connection indicated by the link quality information, and the current connection quality provided by the apparatus 10. Alternatively, if the assessment indicates that a better connection is not available, as shown in step 1110, then in step 1112 at least one threshold is decreased, for example in proportion to the difference in connection quality. Otherwise, the process returns to step 1102.

The process of FIG. 11 may be applied to either the first antenna system or the second antenna system, or may be applied for both antenna systems (where the thresholds may be different for the different sectors). However, in some examples, when this process is applied to the second sector, an additional prioritisation step may be included between steps 1106 and 1110. The prioritisation step checks that the first sector currently provides a connection of adequate quality prior to decreasing the threshold of the second sector in steps 1110 and 1112. The check may be performed by comparing link quality information received from items of user equipment in the first sector with a further threshold, or by way of inspection of the wireless backhaul link. By adjusting thresholds in this manner, the apparatus 10 can account for the effect that implementing a mechanism to influence whether items of user equipment connect to the network via the apparatus will have on the overall quality of service provided by the network. For example, the thresholds may be adjusted to more readily influence items of user equipment in the second sector to disconnect from the apparatus when those items of user equipment have an alternative connection available that will provide a better quality network connection. Conversely, when there is a no better alternative network connection, the thresholds may be adjusted such that a items of user equipment are not as readily encouraged to disconnect from the apparatus 10.

Figure 12:
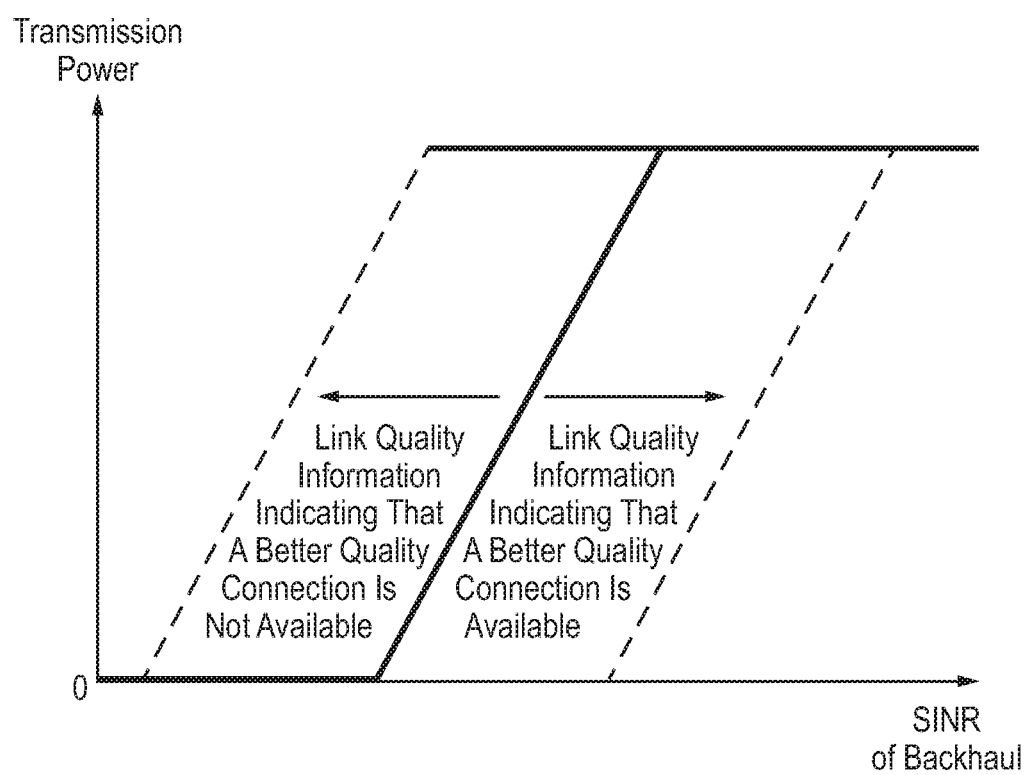
FIG. 12 illustrates how adjusting the thresholds can vary the availability of network connectivity through the combined access and backhaul unit.

FIG. 12 illustrates how thresholds may be varied based on link quality information. As can be seen, when a better connection quality is available to items of user equipment, the thresholds may be increased, such that items of user equipment within the sector are more readily influenced to disconnect from the apparatus 10 and connect to the network via the alternative connection. On the other hand, if the link quality information indicates that a better connection quality is not available, then the thresholds may be decreased such that items of user equipment are more readily influenced to connect to the network via the apparatus 10. This technique may be applied to either or both of the antenna systems included in the apparatus, such that appropriate consideration of the effect of influencing whether items of user equipment connect to the network via the apparatus on the overall quality of service provided by the network can be made before any mechanisms are implemented. It will be appreciated that in some examples a single threshold may be adjusted based on the link quality information, whilst other thresholds remain fixed. For example, in a modification of the example of FIG. 12, only the bottom threshold may be adjusted based on link quality information, whilst the upper threshold remains fixed and is independent to the link quality information.

In the described embodiments, the combined access and backhaul unit 10 can provide public access to all LTE items of user equipment within the coverage area of the first and second sectors. The system is not closed, and is open to any user subscribed to the carrier network.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. An apparatus comprising:
   a first antenna system to provide a first sector of a network;
   a second antenna system to provide a second sector of the network;
   a third antenna system, separate from the first antenna system and the second antenna system, to communicate with a base station to provide a common wireless backhaul link for said first sector and said second sector of the network; and
   control circuitry to monitor a performance characteristic of the common wireless backhaul link, and in dependence on said performance characteristic, to implement at least one mechanism to influence whether items of user equipment within at least one of said first sector and said second sector connect to the network via the apparatus,
   wherein said at least one mechanism comprises transmitting a connection throttling message to one or more items of user equipment, wherein the connection throttling message comprises an indication that at least one of the one or more items of user equipment can no longer connect to the network via the apparatus.

2. The apparatus according to claim 1, wherein said at least one mechanism is further arranged to perform at least one of:
   adjusting a signal strength of signals transmitted by at least one of said first antenna system and said second antenna system; and
   switching at least one of said first antenna system and said second antenna system between an active state and an inactive state.

3. The apparatus as claimed in claim 2, wherein the control circuitry is arranged to adjust said signal strength by adjusting a transmission power of at least one of the first antenna system and the second antenna system.

4. The apparatus according to claim 1, wherein said connection throttling message is one of:
   a targeted connection throttling message to be uniquely transmitted to a targeted item of user equipment, wherein the targeted connection throttling message indicates that the targeted item of user equipment can no longer connect to the network via the apparatus; and
   a multi-connection throttling message to be transmitted to multiple items of user equipment within at least one of said first sector and said second sector, wherein the multi-connection throttling message is configured to trigger each of the multiple items of user equipment to determine, based on its current configuration, whether to disconnect from the apparatus.

5. The apparatus according to claim 1, wherein said first antenna system and said second antenna system are configured such that when the apparatus is deployed at a periphery of a building, the first sector extends into the building to provide enhanced availability of the network to items of user equipment within the building, and the second sector extends externally to the building to provide an additional source of network coverage to items of user equipment external to the building.

6. The apparatus according to claim 5, wherein when the apparatus is deployed inside the building at said periphery, the second antenna system is configured to generate at least one beam pattern that propagates through said periphery to facilitate communication with at least one item of user equipment within said second sector.

7. The apparatus according to claim 6, wherein the apparatus is deployed adjacent to a window at said periphery.

8. The apparatus as claimed in claim 5, wherein the control circuitry is arranged to implement said at least one mechanism to at least influence whether items of user equipment within said second sector external to the building connect to the network via the apparatus.

9. The apparatus according to claim 1, wherein said apparatus is configured to receive link quality information from an item of user equipment indicating a quality of an additional connection option that is available to said item of user equipment to connect to said network rather than connecting via said apparatus.

10. The apparatus according to claim 9, wherein said control circuitry is configured to implement said at least one mechanism in dependence on said performance characteristic and said link quality information.

11. The apparatus according to claim 1, wherein said control circuitry is configured to compare said performance characteristic against at least one performance threshold of said common wireless backhaul link, and to implement said at least one mechanism taking into account said comparison.

12. The apparatus according to claim 11, wherein said control circuitry is configured to compare said performance characteristic against a plurality of performance thresholds of said common wireless backhaul link.

13. The apparatus according to claim 12, wherein:
   said at least one mechanism further comprises adjusting a signal strength of signals transmitted by at least one of said first antenna system and said second antenna system; and
   said control circuitry is configured to adjust said signal strength as a linear function of said performance characteristic when said performance characteristic is between a first and a second of said plurality of performance thresholds.

14. The apparatus according to claim 12, wherein:
   said at least one mechanism further comprises adjusting a signal strength of signals transmitted by at least one of said first antenna system and said second antenna system; and
   said control circuitry is configured to adjust said signal strength as a step function of said performance characteristic when said performance characteristic is between a maximum and a minimum of said plurality of performance thresholds.

15. The apparatus according to claim 11, wherein:
   said apparatus is configured to receive link quality information from an item of user equipment indicating a quality of an additional connection option that is available to said item of user equipment to connect to said network rather than connecting via said apparatus; and said control circuitry is configured to adjust at least one performance threshold of said common wireless backhaul link based on said link quality information.

16. The apparatus according to claim 1, wherein said control circuitry is configured to implement said at least one mechanism to influence whether items of user equipment within the second sector connect to the network via the apparatus and to influence whether items of user equipment within the first sector connect to the network via the apparatus, the control circuitry being arranged to implement said at least one mechanism such that as the performance of the common wireless backhaul link degrades, usage of the second sector to connect to the network is initially inhibited before usage of the first sector to connect to the network.

17. The apparatus according to claim 1, wherein said performance characteristic is indicative of spectral efficiency, and said control circuitry is configured to measure at least one of:
reference signals receive power;
a signal to interference plus noise ratio; and
a throughput of the apparatus,
to determine said performance characteristic of the common wireless backhaul link.

18. The apparatus as claimed in claim 1, wherein said control circuitry is configured to implement said at least one mechanism in dependence on said performance characteristic and a signal indicative of synchronisation information.

19. A method of controlling connection to a network using an apparatus having a first antenna system to provide a first sector of the network, a second antenna system to provide a second sector of the network, and a third antenna system, separate from the first antenna system and the second antenna system, to communicate with a base station to provide a common wireless backhaul link for said first sector and said second sector of the network, said method comprising:

monitoring a performance characteristic of the common wireless backhaul link; and in dependence on said performance characteristic, implementing at least one mechanism to influence whether items of user equipment within at least one of said first sector and said second sector connect to the network via the apparatus, wherein said at least one mechanism comprises transmitting a connection throttling message to one or more items of user equipment, wherein the connection throttling message comprises an indication that at least one of the one or more items of user equipment can no longer connect to the network via the apparatus.

20. An apparatus comprising:
a first antenna means for providing a first sector of a network;
a second antenna means for providing a second sector of the network;
a third antenna means, separate from the first antenna means and the second antenna means, for communicating with a base station to provide a common wireless backhaul link for said first sector and said second sector of the network; and
control means for monitoring a performance characteristic of the common wireless backhaul link and, in dependence on said performance characteristic, for implementing at least one mechanism to influence whether items of user equipment within at least one of said first sector and said second sector connect to the network via the apparatus,
wherein said at least one mechanism comprises transmitting a connection throttling message to one or more items of user equipment, wherein the connection throttling message comprises an indication that at least one of the one or more items of user equipment can no longer connect to the network via the apparatus.

21. The apparatus according to claim 1, wherein the connection throttling message is generated, in part, by the control circuitry of the apparatus.

* * * * *